(12) United States Patent
Claseman

(10) Patent No.: US 7,177,325 B2
(45) Date of Patent: Feb. 13, 2007

(54) OPERATIONS, ADMINISTRATION AND MAINTENANCE (OAM) SYSTEMS AND METHODS FOR PACKET SWITCHED DATA NETWORKS

(75) Inventor: George R. Claseman, San Jose, CA (US)

(73) Assignee: Micrel, Incorporated, San Jose, CA (US)

( * ) Notice: Subject to any disclaimer, the term of this patent is extended or adjusted under 35 U.S.C. 154(b) by 1026 days.

(21) Appl. No.: 10/144,569

(22) Filed: Jul. 25, 2002

(65) Prior Publication Data

US 2004/0165534 A1     Aug. 26, 2004

(51) Int. Cl.
*H04J 3/16* (2006.01)

(52) U.S. Cl. .................. 370/469; 370/474; 370/529

(58) Field of Classification Search .............. None
See application file for complete search history.

(56) References Cited

U.S. PATENT DOCUMENTS

| | | | |
|---|---|---|---|
| 5,600,649 A | 2/1997 | Sharma et al. | |
| 6,023,467 A * | 2/2000 | Abdelhamid et al. | 370/236.2 |
| 6,577,630 B1 * | 6/2003 | Markwalter et al. | 370/392 |
| 6,636,527 B1 * | 10/2003 | Lee et al. | 370/465 |
| 6,909,723 B1 * | 6/2005 | Yonge et al. | 370/447 |
| 6,934,302 B2 * | 8/2005 | Gammenthaler, Jr. | 370/469 |
| 2002/0118420 A1 * | 8/2002 | Liu | 359/139 |
| 2002/0149820 A1 * | 10/2002 | Liu | 359/135 |
| 2003/0026240 A1 * | 2/2003 | Eyuboglu et al. | 370/349 |

OTHER PUBLICATIONS

Telecommunication Technology Committee (TTC) Specification "TS-1000 Optical Subscriber Line Interface—100 Mbit/s Single-fiber Bi-directional Interface by WDM" Version 1 (Nov. 11, 2002) pp. 1-60.

Arnold, Brian, et al. "OAM Support in Copper and Mixed Copper/Fiber EFM Systems", IEEE 802.3ah, Ethernet in the First Mile Task Force Meeting, May 2002.

Barrett, Bob, et al. "EFM OAM: Baseline Transport Proposal", Ethernet in the First Mile Task Force Meeting, May 2002.

(Continued)

*Primary Examiner*—Chau Nguyen
*Assistant Examiner*—Jordan Hamann
(74) *Attorney, Agent, or Firm*—Bever, Hoffman & Harms, LLP; Patrick T. Bever

(57) ABSTRACT

The invention includes a protocol, systems and methods for operating, administering, and maintaining (OAM) physical links in a network that carries packet switched data. A network control point implementing the protocol assigns addresses to all ports of the network, discovers network topology and capabilities, and initializes remote parameters through OAM frames sent to the ports. The OAM protocol maintains all physical transmission links through the communication of OAM frames with information concerning link errors and the status of ports and boxes. The OAM frame has a preamble that is an inverse of a preamble of a data frame, allowing decoupling of the OAM and data services. The OAM frames are initiated and terminated at the physical layer of the network. Ports of the network may include ASIC integrated circuits that create, transmit, receive, and process the OAM frames at the physical layer of the ports.

6 Claims, 26 Drawing Sheets

OTHER PUBLICATIONS

Brown, Ben, "OAM, Auto-Negotiation and Far-End Fault", IEEE 802.3ah, Ethernet in the First Mile Task Force Meeting, Jun. 2002, pp. 1-7.

Brown, Ben, "Details of PHY OAM in 1000BASE-X", IEEE 802.3ah, Ethernet in the First Mile Task Force Meeting, Jun. 2002, pp. 1-26.

Claseman, George, "OAM for EFM", Micrel—Kendin Operations, IEEE 802.3ah, Ethernet in the First Mile Task Force Meeting, May 2002, pp. 1-19.

Claseman, George, "OAM for EFM: PHY OAM", Micrel—Kendin Operations, IEEE 802.3ah, Ethernet in the First Mile Task Force Meeting, Jul 2002.

Fujimoto, Yukihiro, et al. "OAM in Preamble FAQ", IEEE 802.3ah, Ethernet in the First Mile Task Force Meeting, May 2002, pp. 1-18.

Mickelsson, Hans, et al. "Why OAM PHY?" Ethernet in the First Mile Task Force Meeting, Jun. 2002.

Simon, Scott, "EFM Copper: MIB Organization", IEEE 802.3ah, Ethernet in the First Mile Task Force Meeting, Mar. 2002, pp. 1-4.

Simon, Scott, "EFM Copper: Flexibility and Bandplans", IEEE 802.3ah, Ethernet in the First Mile Task Force Meeting, May 2002, pp. 1-9.

Squire, Matt, "EFM OAM: Schedule and Work Plan", Ethernet in the First Mile Task Force Meeting, May 2002.

Suzuki, Hiroshi, et al. "PHY OAM Baseline Proposal", IEEE 802.3ah, Ethernet in the First Mile Task Force Meeting, Jul. 2002, pp. 1-20.

* cited by examiner

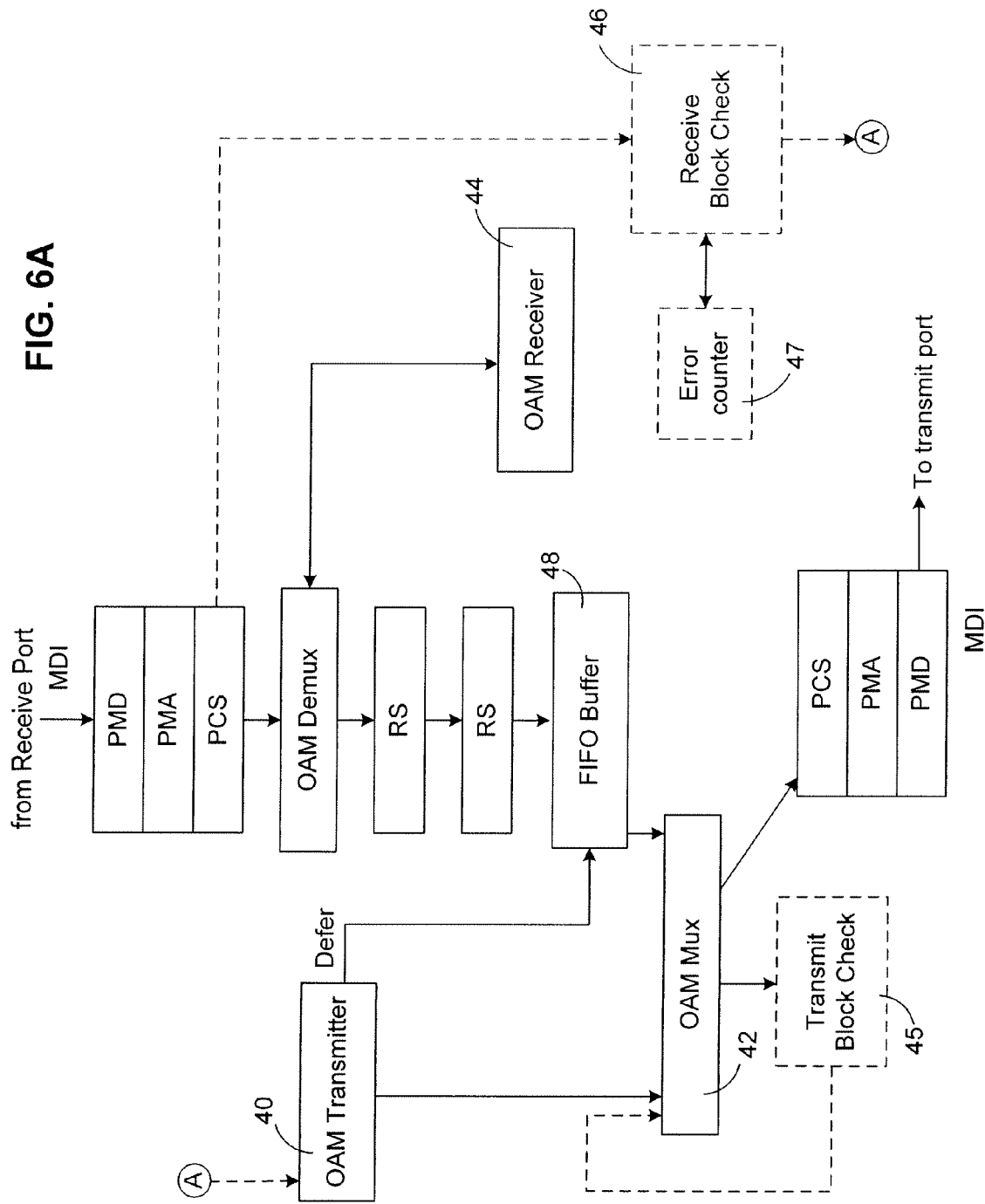

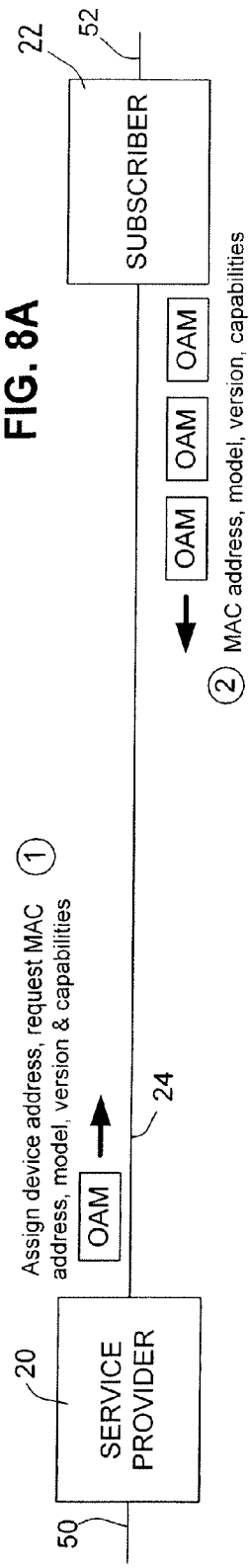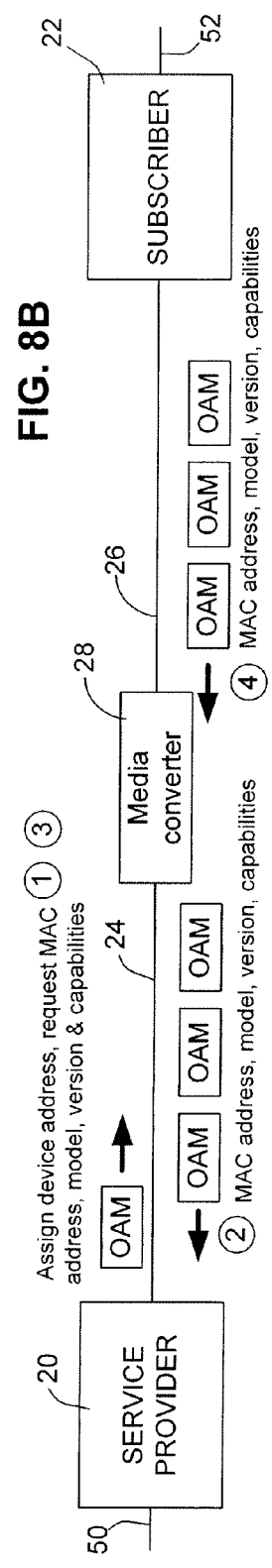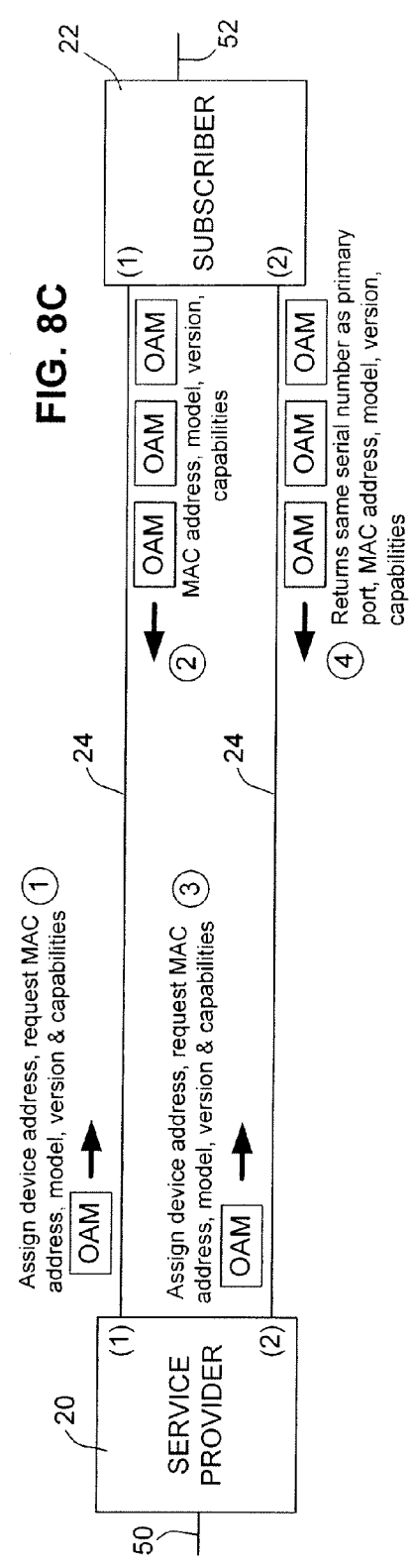

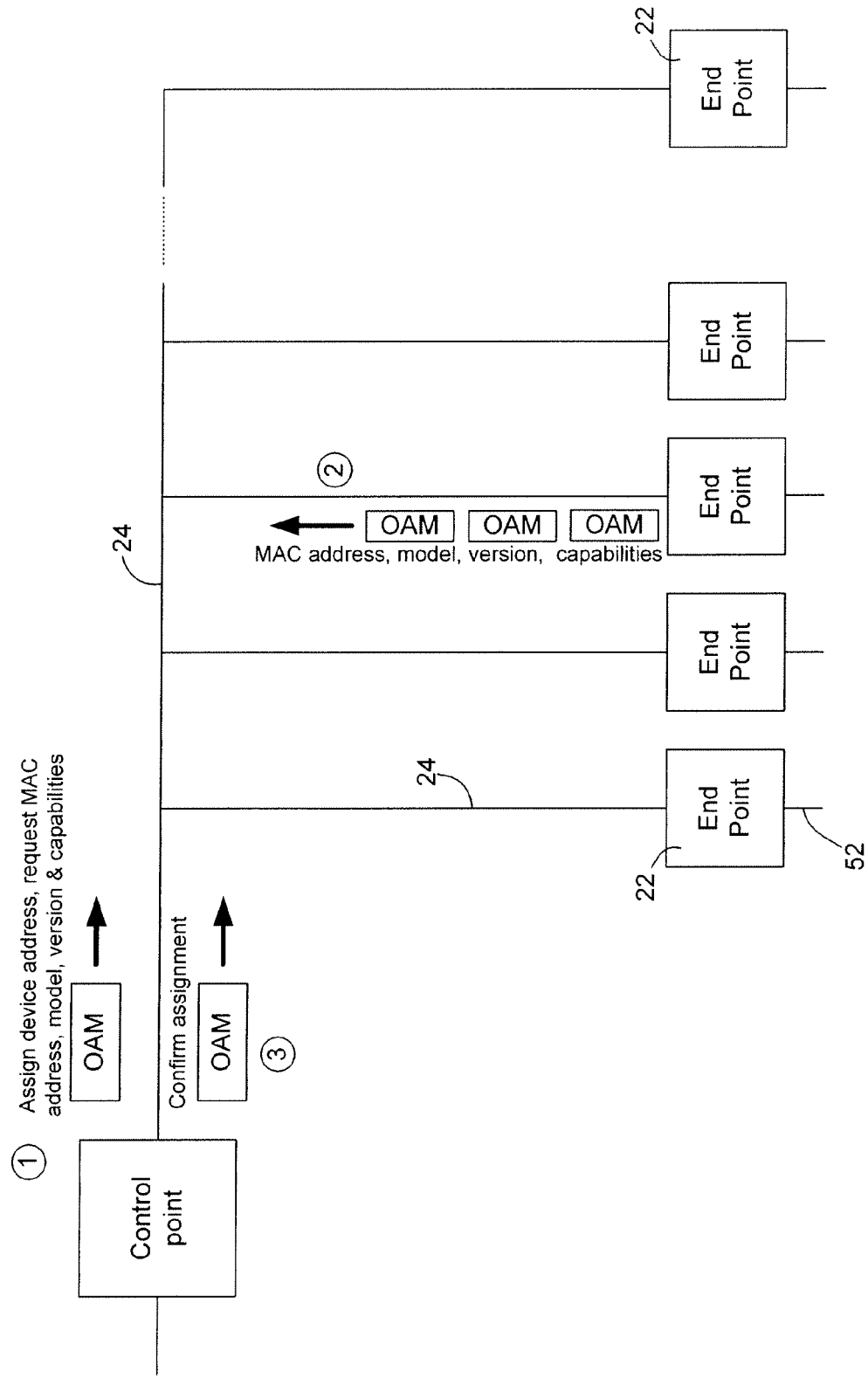

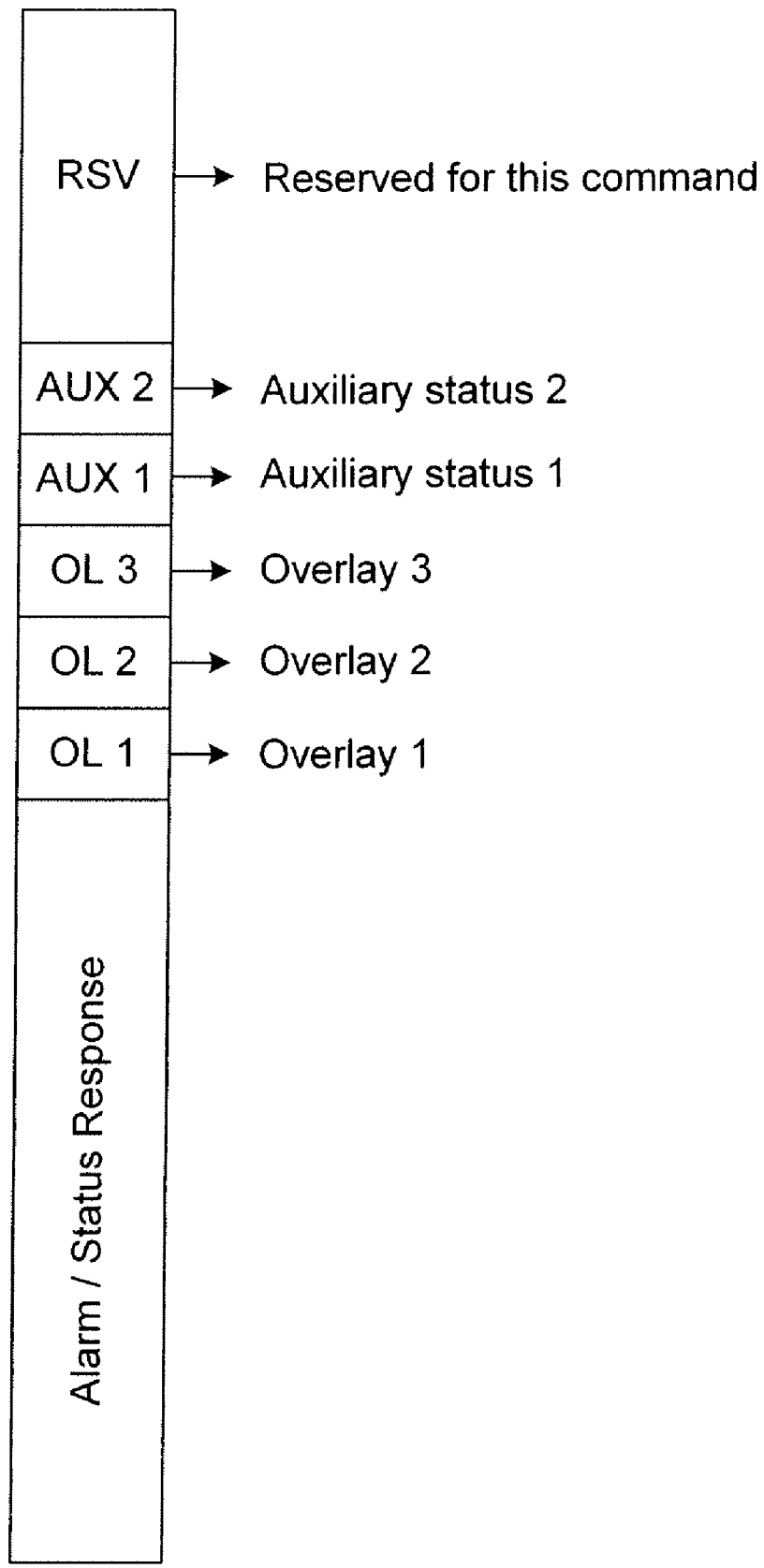

OPERATIONS, ADMINISTRATION AND MAINTENANCE (OAM) SYSTEMS AND METHODS FOR PACKET SWITCHED DATA NETWORKS

BACKGROUND OF THE INVENTION

1. Field of the Invention

The present invention involves systems and methods for remotely operating, administering, and maintaining physical links in a network that carries packet switched data.

2. Description of the Related Art

A data network typically is comprised of a plurality of hosts that communicate over an infrastructure. The infrastructure may include fiber, electrical, or wireless links, and network assemblies such as switches, routers, and media converters, among other things. A unit on the network is commonly and generically called a box, with each box having at least one of an egress port to the network and an ingress port from the data network. Types of data networks include, for instance, local area networks (LAN), metropolitan area networks (MAN), and wide area networks (WAN). A collection of interconnected networks is an internetwork or internet.

Most data networks are organized as a series of layers (also called levels), one built on the one below it. The purpose of each layer is to offer certain services to the higher layers, and to shield those higher layers from the details of how the offered services are actually implemented. The number of layers, the name of each layer, the contents of each layer, and the function of each layer vary from network to network. A layer n in one network device communicates with a corresponding layer n (a "peer" layer) in another network device according to a protocol.

A protocol is a language that is understood between parties that converse the same way. An example of a protocol is TCP/IP. A set of layers and protocols is a network architecture. A list of protocols used by a certain data network is a protocol stack.

In reality, no data are directly transferred from the layer n on one network device to the layer n on another network device. Instead, each layer passes data and control information to the layer immediately below it until the lowest layer is reached. Protocols that converse at a certain layer also terminate at that layer, but agnostically use protocols in lower layers as a transport means. Below the lowest layer is the physical transmission medium through which the actual communication occurs. Between each pair of adjacent layers is an interface. The interface defines which primitive operations and services the lower layers offer to the upper one.

An example of a network architecture is the OSI (Open Systems Interconnection) model. The OSI model includes seven layers, as shown in FIG. 1. Layer 1, the physical (PHY) layer, is the lowest layer. Generally, the PHY layer is concerned with serially transmitting and receiving data over the physical transmission medium, recovering the embedded clock, applying any coding or scrambling to the data stream, and aligning the data containers for use by the next upper layer, the Data Link Layer (DLC).

The DLC layer is responsible for maintaining the data link between the communicating systems. The DLC includes two sublayers: the Medium Access Control (MAC) sublayer and the Logical Link Control (LLC) sublayer. The MAC sublayer functions include framing and deframing data units, performing error checking, and acquiring the right to use the underlying physical medium where there is contention for bandwidth. The MAC sublayer makes a decision, based on proper order, frame length, and error checking whether received data is to be passed to the next upper layer. The LLC sublayer functions include initiation of control signal interchange, organization of data flow, interpretation of received command protocol data units (PDUs) and generation of appropriate response PDUs, and actions regarding error control and error recovery functions in the LLC sublayer.

Layer 3 of FIG. 1, the network layer, is responsible for an end to end addressing scheme for interconnecting a variety of networks, and fragmentation of data packets when the length of the packet is limited by an intermediate network. Layer 4, the transport layer, is responsible for an end to end accounting (where desired) for data packets and a connection into the application, e.g., HTTP, FTP, and SMTP. Layer 5, the session layer, allows users on different hosts to establish sessions between them. Layer 6, the presentation layer, is concerned with the syntax and semantics of the information transmitted. Finally, layer 7, the application layer, is application dependent, and provides a pathway to the application.

The Institute of Electrical and Electronic Engineers (IEEE), a professional standards organization, has developed a family of standards for LANs and MANs known as the IEEE 802 standards, which are well known and are incorporated herein by reference in their respective entireties. One of those standards, known as the IEEE 802.3 standard (incorporated herein by reference in its entirety), establishes a frame structure for data transmitted over the physical transmission medium.

FIG. 2 shows the nine fields of a typical frame in accordance with the IEEE 802.3 standard. The nine fields include a preamble field of up to seven bytes, each containing the bit pattern 10101010. The next field, the start of frame delimiter, is set to the sequence 10101011, and indicates the start of a frame. Next are fields of six bytes each for the destination and source addresses. The length field indicates how many bytes are present in the data field, which follows. The pad field is used to fill out the frame to a minimum size. The frame check sequence field (FCS) includes a four-byte cyclic redundancy check (CRC) value that is a function of the contents of all data symbols in the frame, excluding the preamble. Finally, there may be an extension field. Between every frame is a gap, which is sized to correct for clock differences between a transmitter and a receiver. A typical gap is 96 bit times. An idle (IDL) signal is transmitted in the gap. The IDL signals exist at the PHY layer only. The MAC sublayer of the DLC does not accept or use the IDL signals.

Operating, administering, and maintaining the physical transmission links between devices (e.g., at a control point and at an end user) in a data network is a key concern of those who own, manage, and use data networks. For instance, FIGS. 3A and 3b are simple examples of links between a service provider 20 (here, the control point) and one or more subscribers 22 (here, the end points). The service provider may be, for example, an Internet service provider or a telephone company that provides access to a larger network. The subscriber may be a business that has an internal LAN, or an individual in a home. The data network of FIG. 3A includes a point-to-point link between the service provider 20 and the subscriber 22. The actual physical links controlled by service provider 20 include a fiber optic link 24 between service provider 20 and a media converter 28, and an electrical link 26, which may be a twisted pair of copper wires or coaxial cable, between media converter 28 and subscriber 22. For instance, electrical link 26 may be an xDSL or regular Ethernet connection over Category 5 cabling. In FIG. 3B, the data network includes multiple subscribers 22. A fiber optic link 24 is linked between service provider 20 and a switch 30 to which the plural subscribers 22 are connected by separate electrical links 26.

Assume that a problem occurs with the connection between the service provider 20 and the subscriber 22 in the exemplary data networks of FIGS. 3A and 3B. The service provider 20 can run a loopback check that tests the network up to a demarcation point between service provider 20 and subscriber 22. If a problem is found during the loopback check, then service provider 20 will seek to identify a hasty repair. If no problems are found, then the problem is isolated to subscriber 22. If the subscriber 22 fails to isolate the problem further, however, there may be a dispute between the service provider 20 and the subscriber 22 as to who is responsible for identifying and fixing the problem. Typically, the service provider 20 must send a maintenance person to the demarcation point at subscriber 22's site, which can involve a significant expense of time and money. Even then, however, the subscriber 22 may develop a feeling of poor customer service on the part of the service provider 20. Clearly, it would be in the interest of those who operate, administer, and maintain data networks to be able to operate, administer, and maintain the entire physical transmission link between the service provider and the subscriber by automatic means, such that any problems in the physical transmission links or at intermediate points in the data network up to the demarcation point can be quickly and specifically identified, or problems may be conclusively identified as being beyond the demarcation point.

SUMMARY OF THE INVENTION

The present invention includes a multistate protocol for operating, administering, and maintaining physical links in a network that carries packet switched data, e.g., a data network or a telephony network, along with methods and systems that use or implement, in whole or part, the protocol in such networks. The protocol operates at the physical layer of a network architecture model, such as the OSI model, or some other network architecture model. Some form of a physical layer is common to networks that carry packet switched data. Hence, the protocol, methods, and systems of the present invention are generally applicable to packet switched data networks or other networks that carry packet data, such as channelized telephony (e.g., xDSL, T1/E1, and OC3).

The protocol is called the Operations, Administration, and Maintenance (OAM) protocol herein. The OAM protocol includes the use of small, short-duration OAM frames that are intermixed with other data traffic on the data network. The OAM frames carry information that allows a control point of the network to operate, administer, and maintain the physical transmission link between all points in the data network. The OAM frames are not passed to or understood by levels above the physical layer in the network architecture. Hence, the OAM function can be performed without interfering with the higher levels in the protocol stack.

In a hierarchical fashion, a control point implementing the OAM protocol assigns an address structure, discovers the entire topology of the network up to the demarcation point, and perhaps even beyond into an end user's network, and initializes remote parameters through the use of OAM frames sent to all of the accessible ports of intermediate and end point boxes. Once operational, the OAM protocol maintains all physical transmission links in the data network through the communication of OAM frames to the control point that include information concerning the status, including alarms, at all ports in the data network between the control point and end point. Intermediate and end points may send such OAM frames to the control point in response to an inquiry from the control point or as an unsolicited alarm, e.g., imminent power failure.

The OAM protocol may be used to control and maintain the physical transmission link between all ports of all boxes of the network for the purposes of remote observability and line diagnosis. In addition, service parameters can be changed to accommodate services required by the subscriber. For instance, a subscriber may wish to have a robust connection to the service provider. The OAM protocol would allow a service provider to monitor the transmission error rate in real time and make appropriate changes to maintain the robust connection.

These and other aspects of the invention will be elucidated in the following detailed description of the exemplary embodiments and in the accompanying drawings thereof.

BRIEF DESCRIPTION OF THE DRAWINGS

FIG. 6A is a block diagram of an alternative OAM system for implementing the OAM protocol in a physical-layer-only box of a packet switched data network, in accordance with one embodiment of the invention.

FIGS. 8A–8D are diagrams that show exemplary addressing processes performed in accordance in accordance with one embodiment of the invention.

FIG. 13A is a diagram of a response field of the OAM frame of FIG. 13.

In the drawings, like or similar features are typically labeled with the same reference numbers.

DETAILED DESCRIPTION

One embodiment of the present invention includes an OAM protocol that resides and operates in the physical layer of a packet switched data network, below the layers responsible for framing and deframing standard data frames. The modality by which the OAM protocol operates is through special, short-duration frames, called OAM frames herein, that are interleaved with data frames and are transmitted back and forth over one or more physical transmission links of a packet switched data network. The transmission links may be, for example, between ports of: (1) a control point of the network and an end point of the network; (2) the control point and any intermediate boxes of the network, such as media converters, switches, and repeaters, along the physical transmission link between the control point and the end point; (3) an intermediate point and an intermediate or end point; and/or (4) between peers on the network that are coupled by a point to point link, e.g., between adjacent boxes or even between chips coupled within a particular box.

Figure 4:
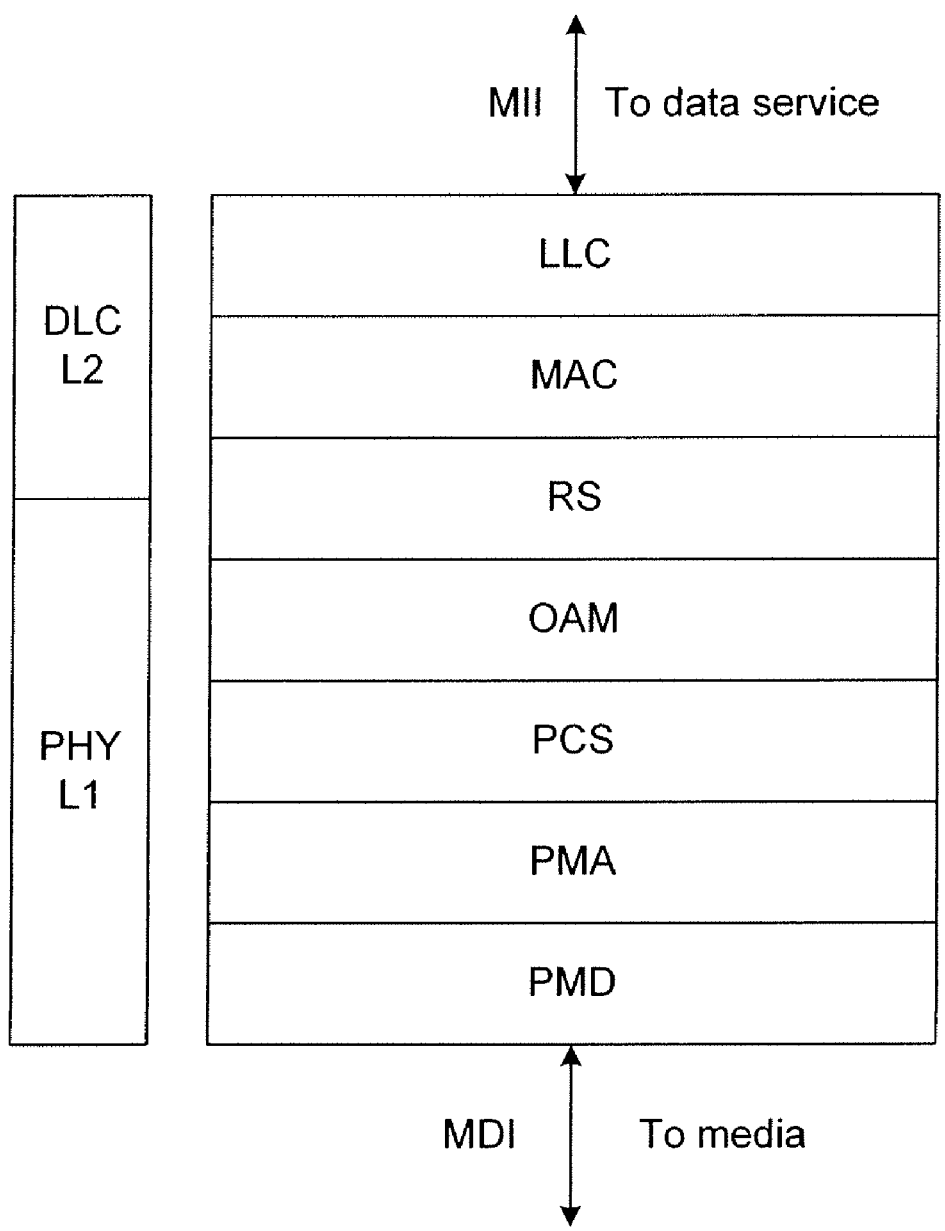
FIG. 4 is a diagram of a protocol stack including an OAM protocol in accordance with one embodiment of the invention.

The OAM protocol resides in the physical layer of a protocol stack. Various network architectures networks may contain different artifacts. For the sake of example, FIG. 4 shows an exemplary location of the OAM layer within the PHY layer of the OSI protocol stack of FIG. 1. Here, the PHY layer is depicted as having four sublayers that are described in the IEEE 802.3 standard, namely the PMD, PMA, PCS, and RS sublayers, and a fifth OAM sublayer that is described herein.

In FIG. 4, the PMD (Physical Medium Dependent) sublayer is responsible for interfacing with the physical transmission medium at the Medium Dependent Interface (MDI). The PMA (Physical Medium Attachment) sublayer is that portion of the PHY layer that contains the functions for transmission, reception, clock recovery, and skew alignment. The PCS (Physical Coding Layer) is concerned with coding data and control symbols for transmission over the transmission medium, and with decoding the data bits received. The RS (Reconciliation) sublayer includes a mapping function that reconciles the signals at the Media Independent Interface (MII) (or some variant thereof, e.g., RMII, SMII, RGMII, and GMII) with next higher layer, i.e., the DLC.

In the protocol stack of FIG. 4, the OAM layer is on top of the PMD, PMA, and PCS sublayers of the PHY layer. This allows the OAM layer to be coding independent. The OAM layer is below the RS sublayer and the MAC sublayer of the DLC layer, i.e., layer 2 of FIG. 1. The OAM sublayer connects to existing PCS interfaces and uses a standard RS sublayer to connect to the MAC sublayer.

The OAM protocol is transparent to the MAC sublayer because the OAM frames used by the OAM protocol, as discussed below, are not received by or recognized by the MAC sublayer as valid data frames.

Figure 5:
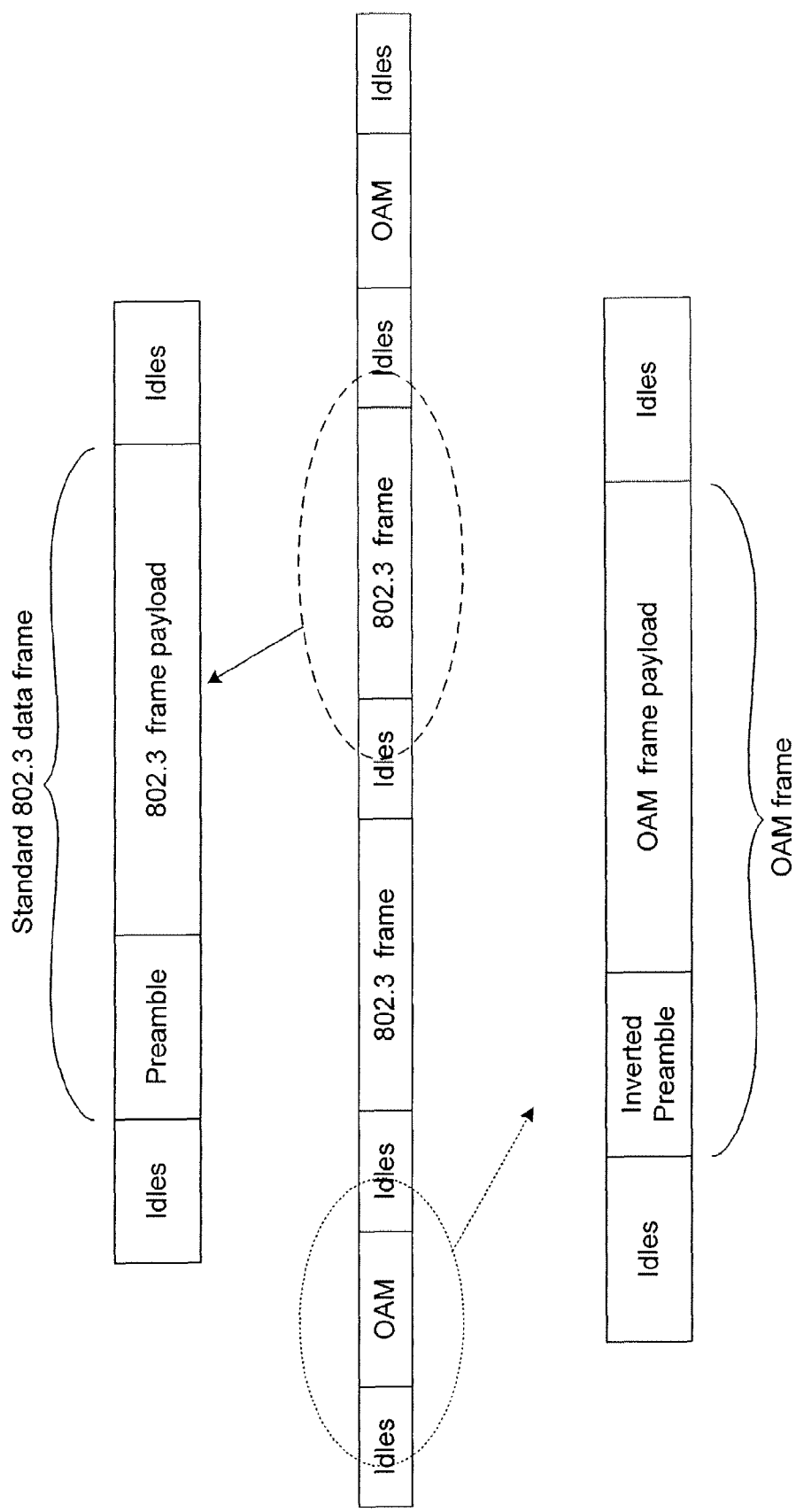
FIG. 5 is a diagram of an OAM frame, within a stream of data frames

The OAM frames are communicated over the physical transmission medium between normal data frames, as depicted in FIG. 5. Like data frames, OAM frames consist of normal data symbols, and generally include a preamble and a payload. IDLs are transmitted before and after data frames and the OAM frames.

In order to differentiate between data frames and the OAM frames, the OAM frames are provided with a one-byte preamble, as illustrated in FIG. 5, that is the inverse of the standard preamble of a standard data frame. Accordingly, the OAM frame can easily be differentiated from data frames in networks that do not support SOF (Start Of Frame) delimiters.

Figure 5A:
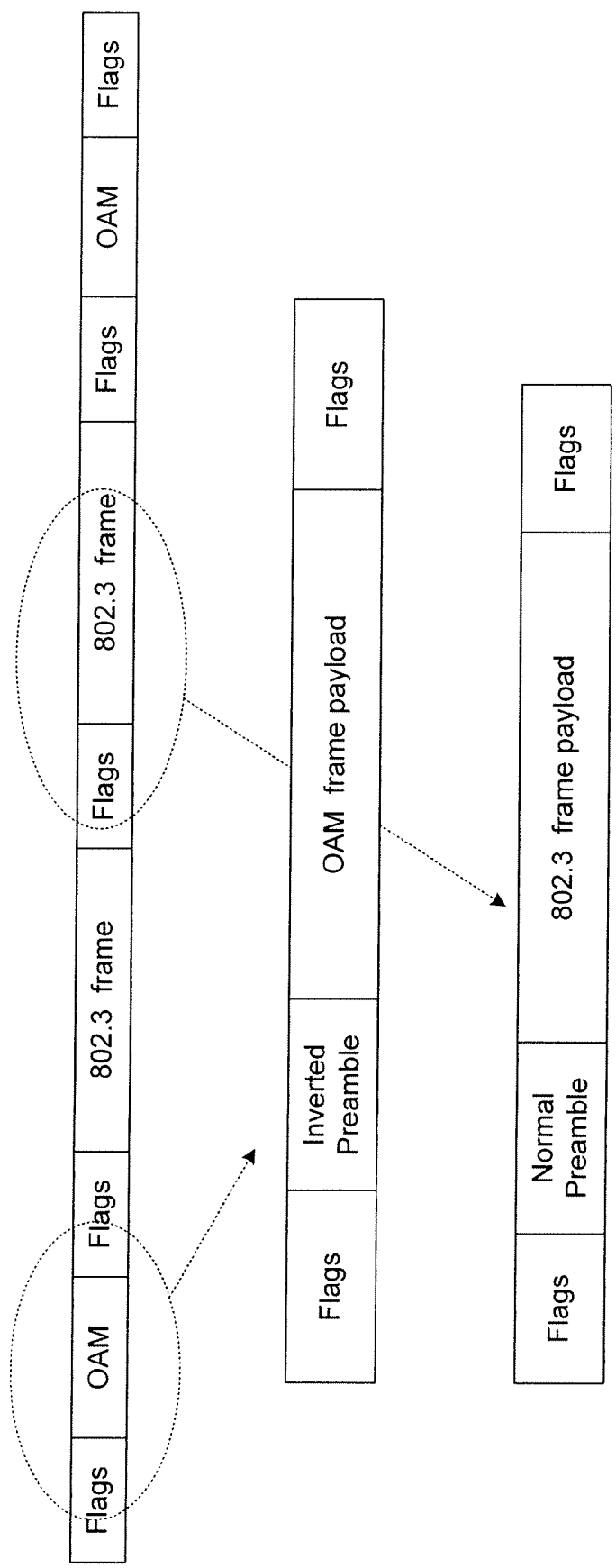
FIG. 5A is a diagram of an OAM frame, within a stream of data frames, where an HDLC framing method is used for the data frames.

In, for instance, a telephony data network where an HDLC method is used for framing, a specific data pattern called a flag (e.g., hex 7E) is used to delimit both the OAM frames and the data frames, as shown in FIG. 5A.

Optionally, the OAM frame may be delimited by a special control symbol or delimiter, in addition to having an inverted preamble that itself distinguishes the OAM frame from a data frame. See, e.g., IEEE standard 802.3ae, clause 46.

Figure 6:
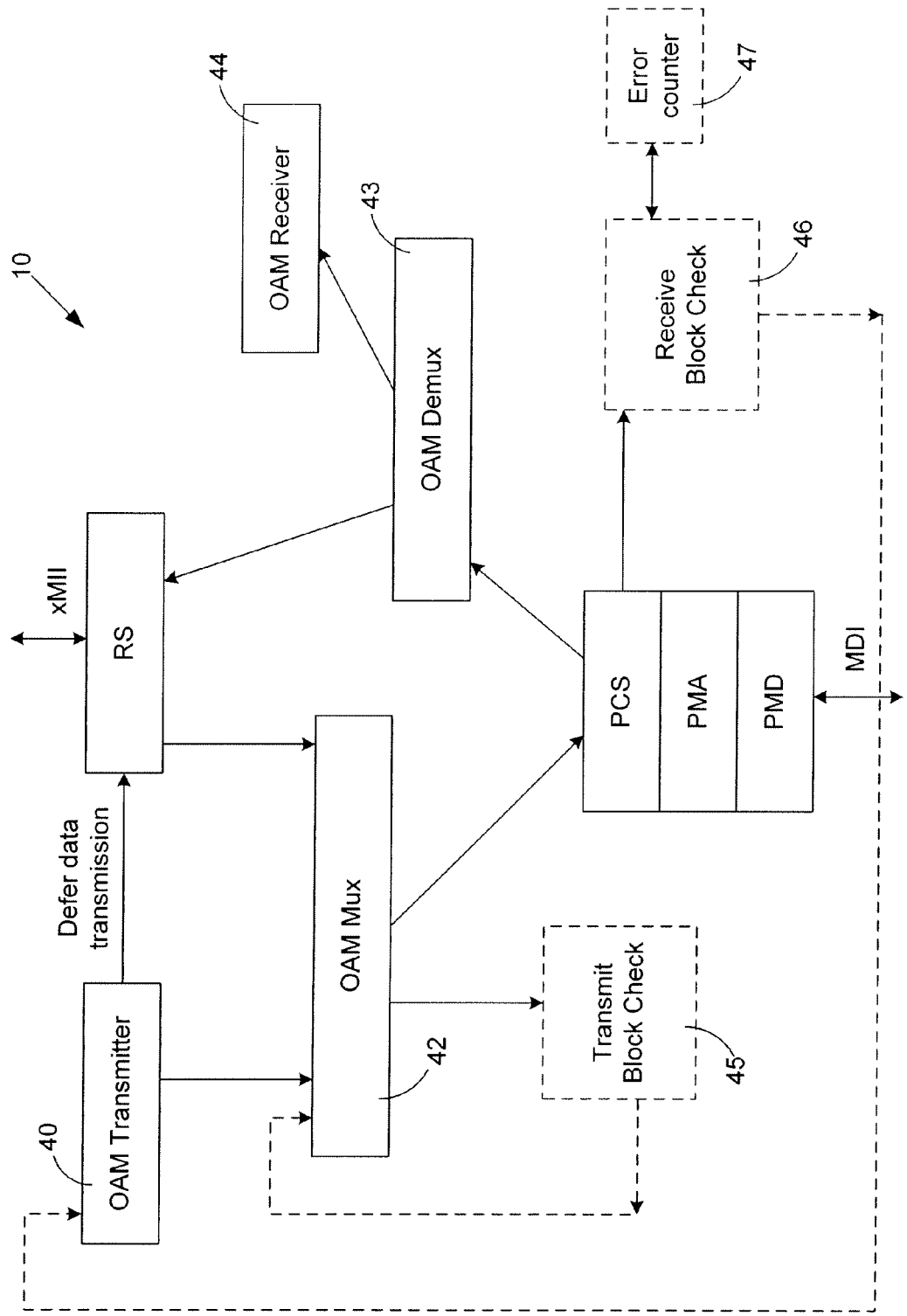
FIG. 6 is a block diagram of an OAM system for implementing the OAM protocol at a port of a box in a packet switched data network, in accordance with one embodiment of the invention.

FIG. 6 is a diagram of an exemplary system 10, in accordance with the present invention, that operates within the physical layer for implementing the OAM protocol. The OAM system 10 of FIG. 6 may be implemented at each port of each box in the data network within one or more semiconductor chips, e.g., an application specific integrated circuit (ASIC), or within a microprocessor or computer that operates using software that is stored in a memory, among other possibilities.

The exemplary OAM system of FIG. 6 includes an OAM transmitter 40, an OAM multiplexer (mux) 42, an OAM demultiplexer (demux) 43, and an OAM receiver 44, in addition to the conventional circuitry and software for implementing the PMD, PMA, PCS, and RS sublayers and the MII and MDI interfaces.

With respect to outgoing communications, OAM transmitter 40 generates the OAM frames, and provides the OAM frames to OAM mux 42. Alternatively, the OAM transmitter 40 may be forwarding OAM frames generated in another part of the data network (e.g., at another port of the same box or in a port of another box on the data network) to OAM mux 42. Likewise, the RS sublayer transmits data frames from the MAC sublayer to the OAM mux 42. OAM mux 42 outputs a single, multiplexed stream of OAM frames and data frames to the PCS, PMA, and PMD layers of the PHY, and from there to the physical transmission medium for communication to the intended recipient.

The OAM system includes a capability to defer data frames for insertion of OAM frames. This capability may be implemented, for instance, by buffering above the PHY layer (e.g., in layer 2 of FIG. 1), or by buffering in the data frame transmit path or the data frame receive path in the PHY layer. In the latter case, and referring to FIGS. 1 and 4, the buffering capability may be coupled to either side of the RS sublayer.

In FIG. 6, layers above the PHY layer are indicated. Hence, OAM transmitter 40 may provide a control input into the RS layer to defer the transmission of data frames by the RS layer to the OAM mux 42, thereby allowing the OAM frames to be transmitted. This deferral method assumes a buffering capability in a layer above the RS sublayer. In an exemplary embodiment, the transmission of data frames could be deferred using an existing method used for half duplex transmissions, in which case there is a well known back off time. See, IEEE 802.3 Alternatively, the carrier sense (CS) signal could be used in full duplex links for a deterministic deferral time that only defers data traffic during assertion. That is, the CS signal already existing at the MII interface could be used to defer the transmission of data frames across the RS sublayer interface, either for insertion of the OAM frames into the data stream or to compensate for rate differences between the physical layer and the MII.

Optionally, OAM mux 42 may receive control inputs from other circuitry or elements in the box when a fatal error or another alarm condition occurs. In such an instance, OAM mux 42 overrides the data selection and immediately transmits an OAM frame toward the control point with information concerning the fatal error or alarm condition, possibly truncating a data frame that is being transmitted at that time. Accordingly, in a case where the reporting port is at an intermediate point or an end point, the control point that receives the OAM frame can be apprised of the situation as soon as possible. In shared networks, e.g., half duplex or point to multi-point, immediate transmission of the OAM frame is not guaranteed.

As mentioned, the OAM system of FIG. 6 also includes OAM demux 43 and OAM receiver 44. OAM demux 43 receives a data stream of OAM frames and data frames from the MDI through the PMD, PMA, and PCS sublayers. OAM demux 43 demultiplexes the data stream based on the preambles of the incoming frames. Received standard data frames are sent by OAM demux 43 to the RS sublayer and ultimately to the MAC sublayer of the DLC layer. Received OAM frames, which OAM demux 43 distinguishes from the data frames by the inverted preambles of the OAM frames, are output to the OAM receiver 44.

Once OAM receiver 44 receives an OAM frame, OAM receiver 44 processes the OAM frame through circuitry or software according to the OAM protocol. For instance, if the received OAM frame indicates a problem condition with the transmitting box, then actions may be taken to correct the problem, such as switching to a redundant transmission link, notifying higher layers in the protocol stack of the problem, or sending an alarm OAM frame back to the control point, among other possibilities.

A port of a box that receives OAM frames, whether it be at a control point, intermediate point, or end point, must process received OAM frames in accordance with the OAM protocol. It must be determined whether the received OAM frame is addressed to the port itself, or whether the OAM frame is addressed to a port in the same or another box on the data network to which the receiving port can route OAM frames, in which case the OAM frame must be sent to the appropriate port.

Figure 15:
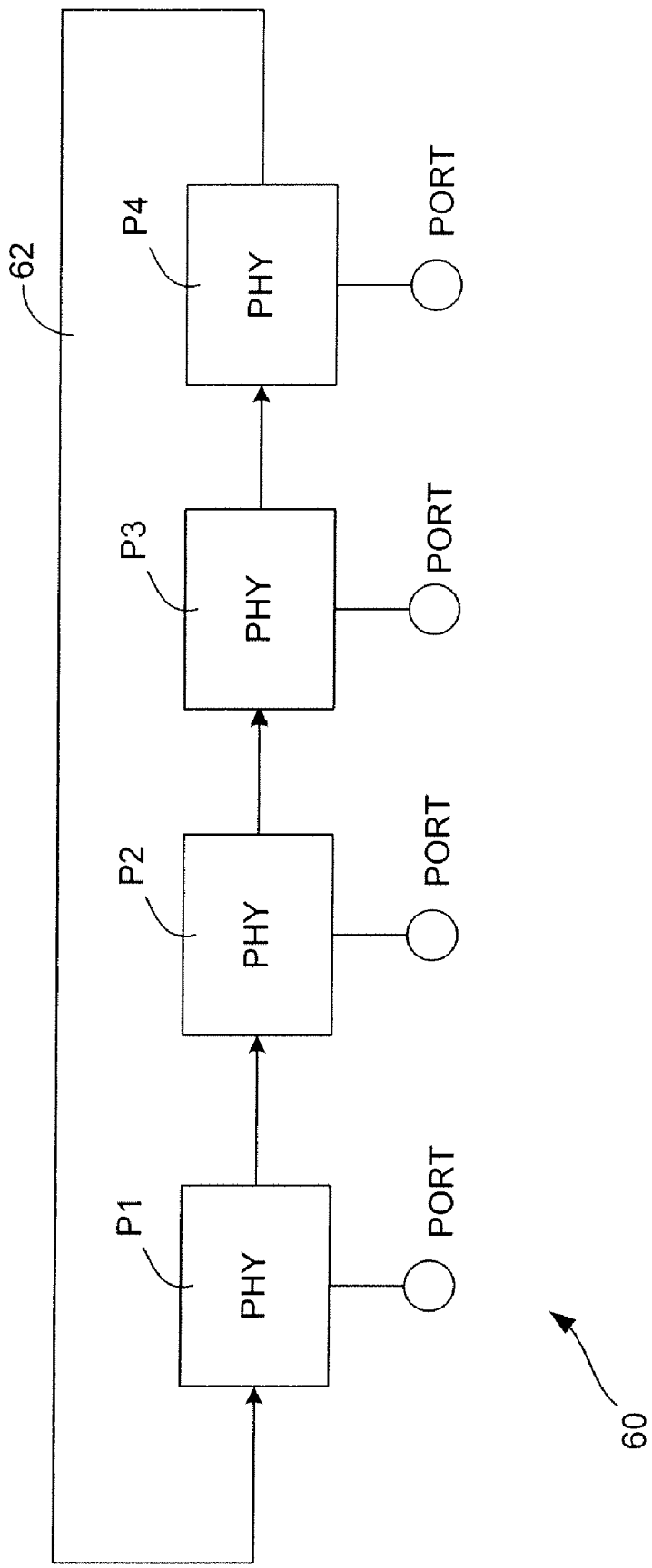
FIG. 15 is a diagram of a portion of an exemplary OAM system interconnecting ports of a box in a ring for communication of OAM frames from one port to another port within the box.

FIG. 15 is a block diagram of an embodiment of a system 60 in accordance with the present invention for handling received OAM frames. System 60, which may be implemented in one or more integrated circuits or in a microprocessor operating with software stored in a memory, operates at the physical layer of a box on a data network. In this case, the box has four physical ports, labeled P1–P4. The ports of the box, each of which is associated with a PHY layer of the protocol stack (e.g., FIG. 1), are coupled in a ring 62. In operation, one port of the box initially receives an OAM frame. The initial port looks at address and direction fields in the OAM frame (see below), and determines whether the OAM frame is intended for itself, in which case the OAM frame is processed according to the OAM protocol, or whether the OAM frame is intended for a port in another box that may be reached through the initial port, in which case the initial port sends the OAM frame to an ingress port of the outlying box. If the OAM frame is not addressed to that initial port or to an outlying port to whom the initial port can route the OAM frame, then the initial port prepends a count value to the OAM frame equal to the number of ports of the box minus two (e.g., 4−2=2), thus decrementable to zero, and then outputs OAM frame onto the ring 62 for forwarding to the PHY layer of next port in the ring 62, to which the PHY layer of the initial port is coupled. The process is then repeated, and if the OAM frame is passed to the next port, the count value is decremented. Ultimately, the OAM frame will have been: (1) internally processed by an OAM system of a port within the box; (2) sent out of the box by an OAM system of a port that recognizes the OAM frame as being intended for a port of an outlying box that can be reached through that port; or (3) the count value prepended to the OAM frame will be entirely decremented (e.g., to zero), in which case the OAM frame is squelched by the last port of the ring as being erroneous.

Figure 16:
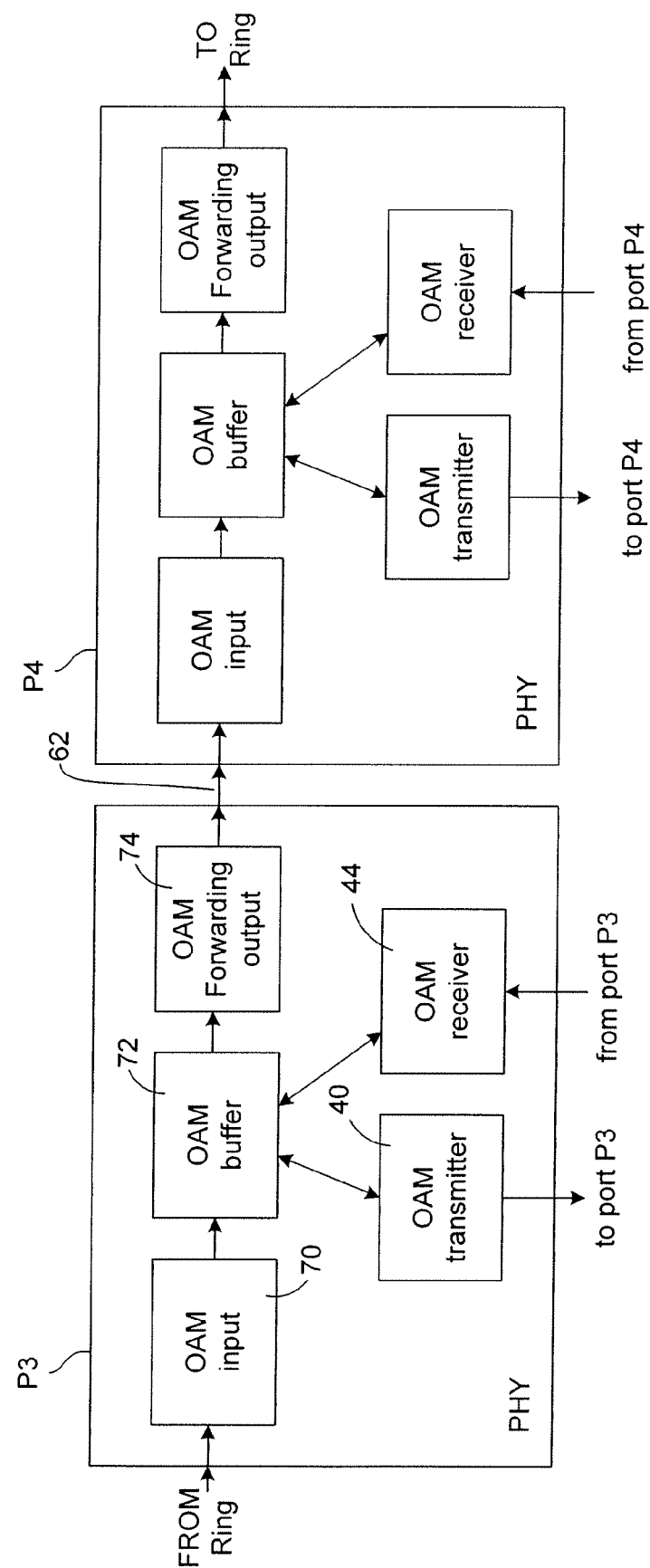
FIG. 16 is a diagram of a portion of an exemplary OAM system implemented at the ports shown in FIG. 15.

FIG. 16 shows and embodiment of a method for handling received OAM frames within a box having the ring architecture of FIG. 15. Within the PHY layer for each port 30 of FIG. 16, there is an OAM input 74. OAM buffer 72, and an OAM forwarding output 74. OAM buffer 72 is coupled to, for example, OAM transmitter 40 and OAM receiver 44 of FIG. 6. OAM buffer 72 provides elasticity of the ring 62. The PHY layers of ports P3 and P4 of FIG. 15 are shown for the sake of example.

Figure 17:
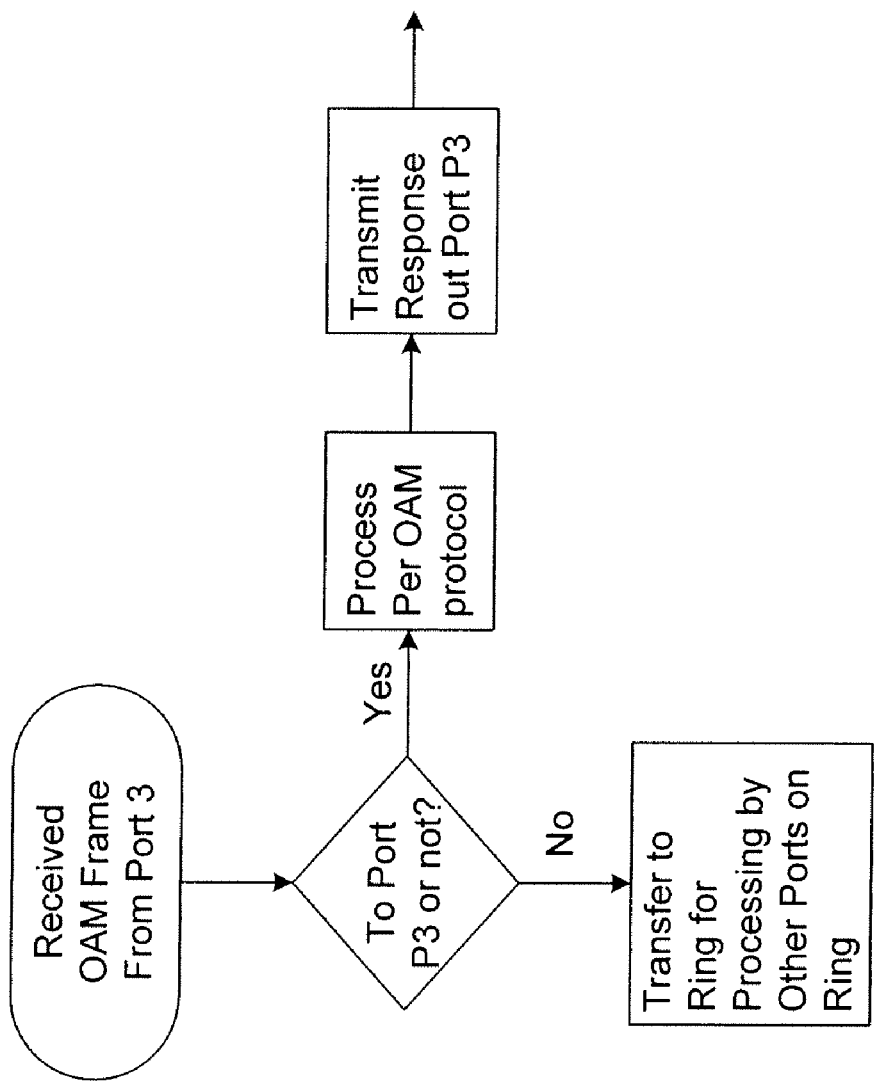
FIG. 17 is a flow chart of a method for handling OAM frames received at a port of FIG. 16 from another box on the data network.

FIG. 17 provides a flow chart of a method of handling an OAM frame received in the PHY layer of port P3 through port P3. The OAM frame input into port P3 goes to the OAM receiver 44 in the PHY layer of port P3, and is examined therein to determine (by compare, for instance) whether the OAM frame is addressed to port P3 or not. If not, then the OAM frame is sent through OAM buffer 72 and OAM output stage 74 to the PHY layer of the next port on the ring, port P4. If, however, the OAM frame is addressed to port P3, then the OAM frame is processed according to the OAM protocol, with the result being that OAM transmitter 40 generates and send a response OAM frame back to the control point through port P3.

Figure 18:
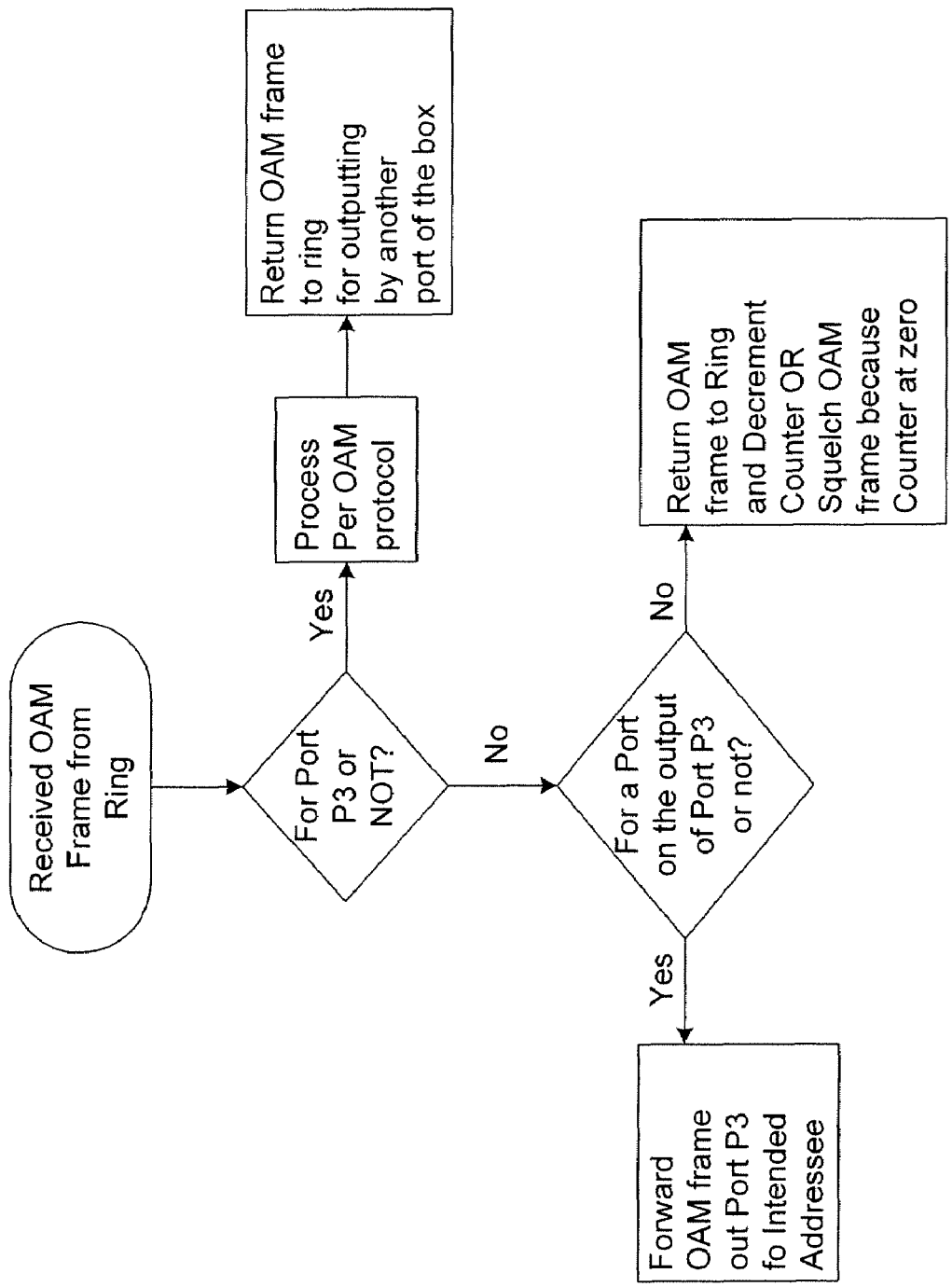
FIG. 18 is a flow chart of a method for handling OAM frames received at a port of FIG. 16 from another port on the ring of the box.

FIG. 18 is a flow chart of a method of handling an OAM frame received in the PRY layer of port P3 from upstream port P2 via ring 62. The OAM frame is initially received by OAM input stage 70 (FIG. 16), which determines (by address comparison) whether the OAM frame is intended for port P3 or not. If the received OAM frame is addressed to port P3, then the OAM frame is sent through OAM buffer 72 to OAM receiver 44 and OAM transmitter 40, which together create a response OAM frame that is provided back to the ring 62 through OAM buffer 72 and OAM output stage 74. If, however, the received OAM frame is not intended for port P3, then OAM input stage 70 must first determine from a map at port P3 whether the OAM frame is addressed to a port of another box that can be reached through port P3, in which case the OAM frame is provided through OAM buffer 72 to OAM transmitter 40 and is forwarded out of OAM transmitter 40 to the outlying port. If the received OAM frame is not intended for port P3 and is not intended for an outlying port accessed through port P3, then OAM input stage 74 decrements the previously-prepended counter on the OAM frame, as discussed above, and either squelches the OAM frame, if the counter is zeroed, or outputs the received OAM frame to the PHY layer of the next port on the ring 62, i.e., port P4, through OAM buffer 72 and OAM output stage 74. The PHY layers of ports P4 or P1 will either process the received OAM frame, forward the OAM frame to an outlying port addressed through that respective port, or will squelch the OAM frame as being erroneous when the counter is fully decremented.

Figure 15A:
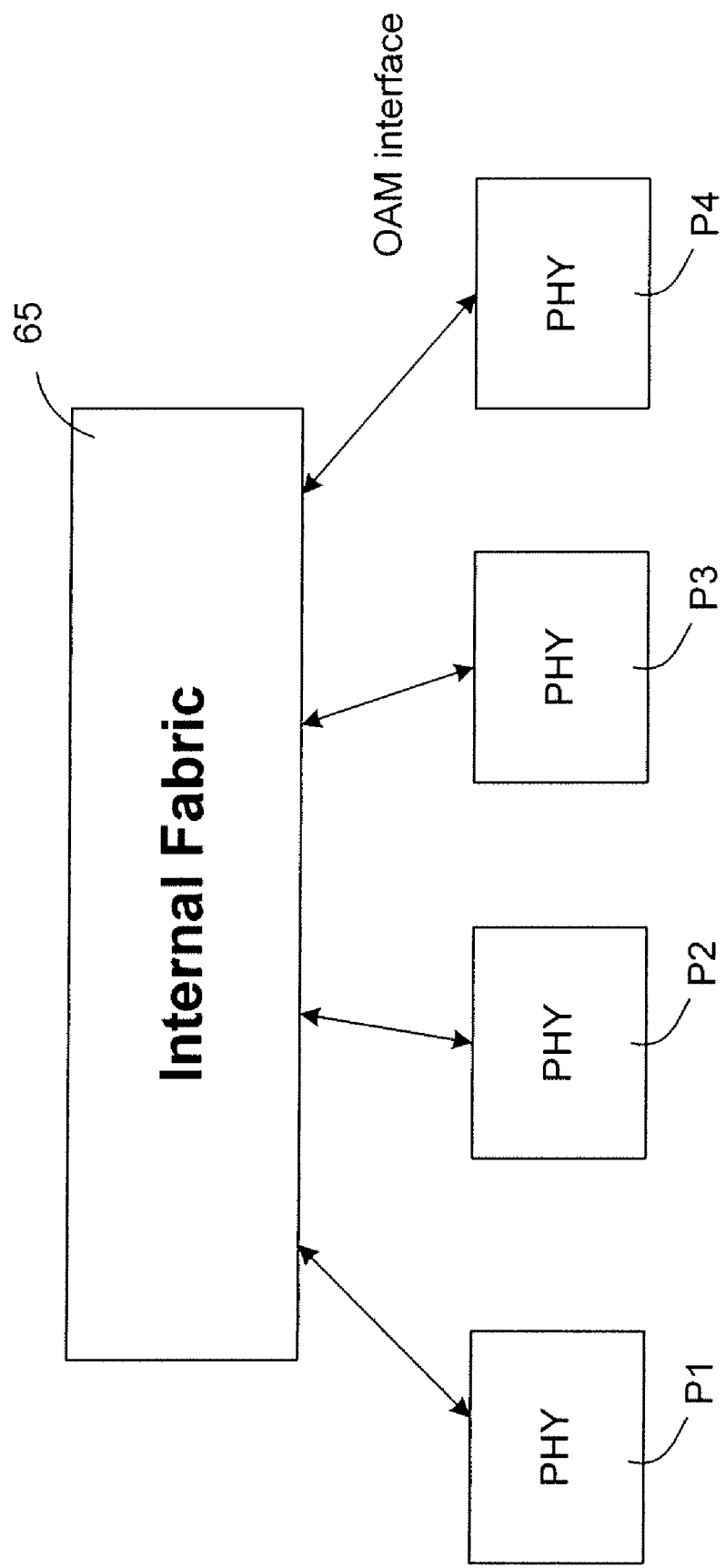
FIG. 15A is a diagram of an alternative OAM system interconnecting ports of a box for communication of OAM frames from one port to another within the box.

Of course, coupling the ports of a box in a ring in order pass OAM frames among the various ports of a box, as shown in FIG. 15, is optional. FIG. 15A shows an alternative arrangement where some internal fabric 65 of the box interconnects the PHY layers of four ports P1–P4. The internal fabric 65 can be a switch mechanism or some other mechanism that allows OAM frames to be passed from port to port.

Figure 1:
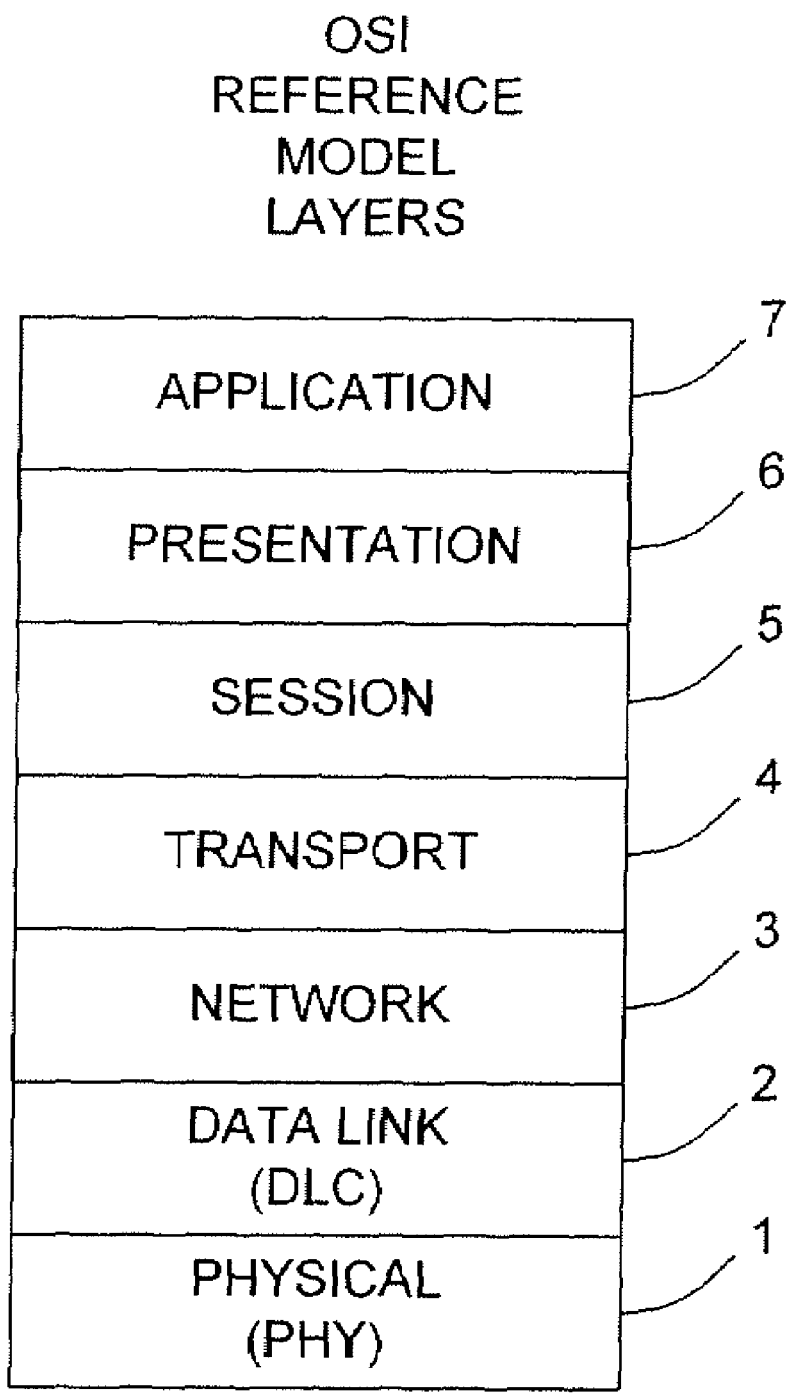
FIG. 1 is a diagram of an exemplary network architecture for a packet switched data network.

Certain types of boxes that are common in data networks operate only at the physical layer, and do not include upper layers of a protocol stack, e.g., layers 2 and above of FIG. 1. Such boxes can include repeaters and media converters. In such physical layer boxes, an incoming stream of data frames is typically sent out as it comes in. Accordingly, an OAM system for such a PHY-only layer box is shown in FIG. 6A. In addition to OAM system elements common to FIG. 6, i.e., OAM transmitter 40, OAM multiplexer (mux) 42, OAM demultiplexer (demux) 43, and OAM receiver 44, a first in-first out (FIFO) buffer 48 is provided in the data stream. The FIFO buffer 48 receives and stores the incoming data stream in order that the OAM transmitter 40 may insert an OAM frame into the data stream. OAM transmitter 40 includes a control input into FIFO buffer 48. Practitioners will appreciate that only one direction of data flow is shown in FIG. 6A, and that a full duplex Operational could be supported by a mirror image arrangement in the opposite direction.

Figure 2:
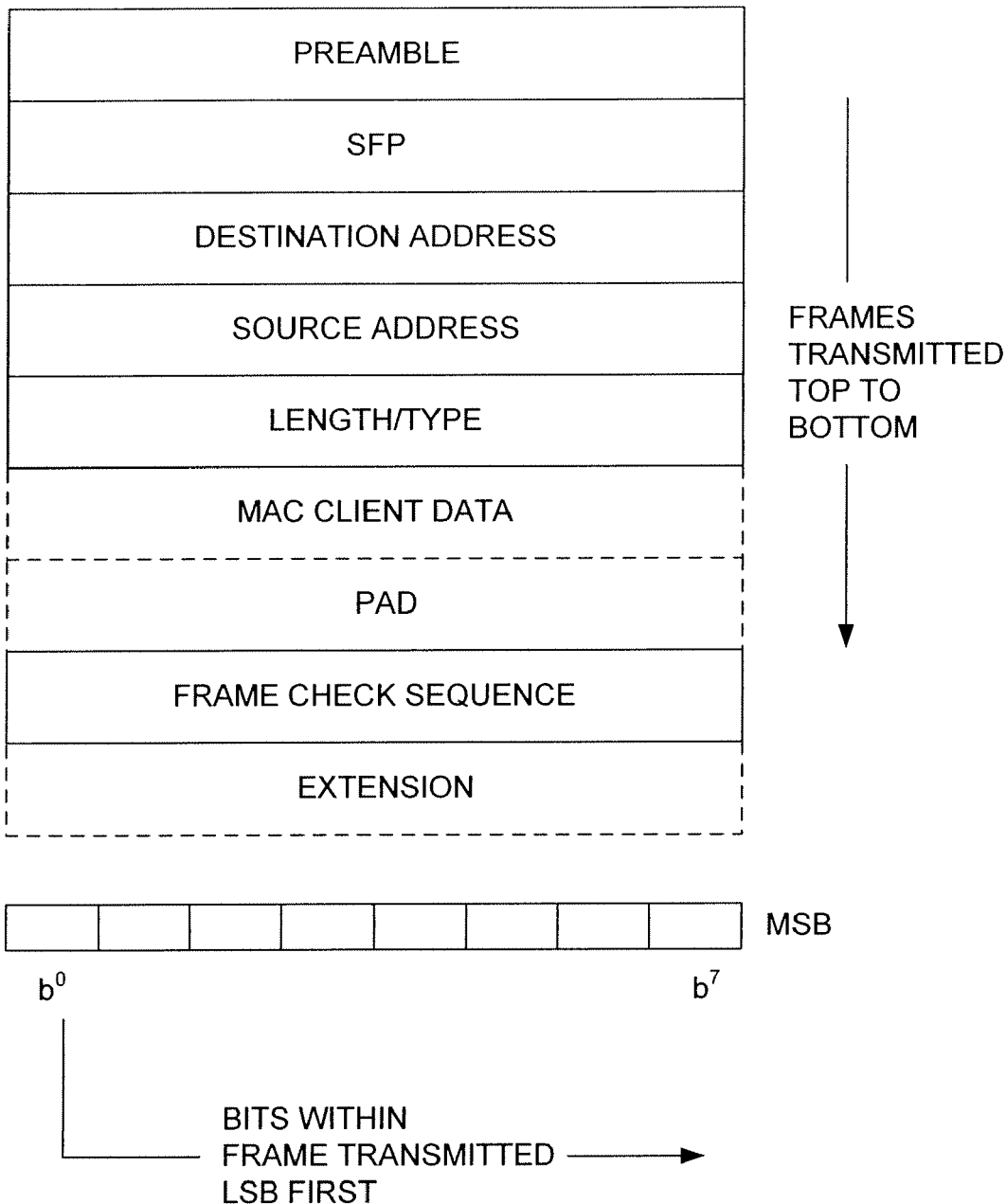
FIG. 2 is a diagram of a typical data frame of a packet switched network, including various fields of the frame.
Figure 3A:
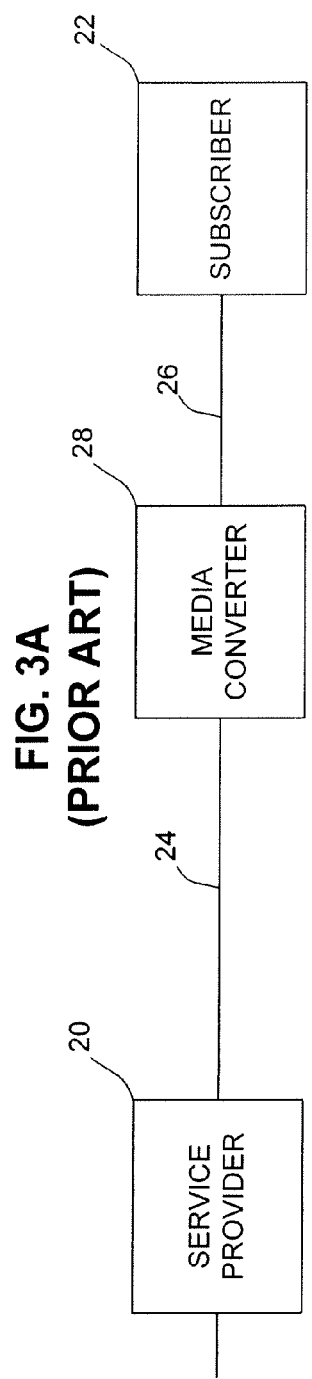
FIGS. 3A and 3B are diagrams of portions of a packet switched data network.
Figure 3B:
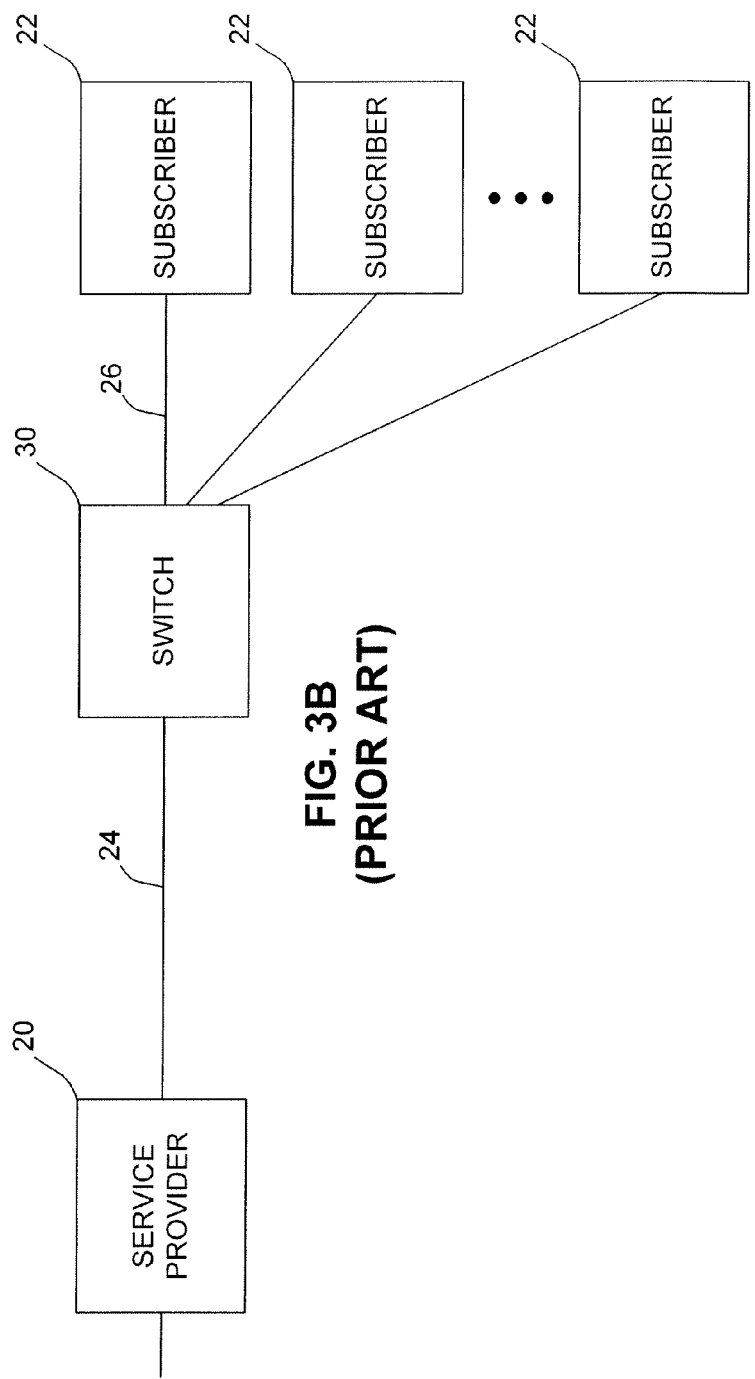
Figure 9:
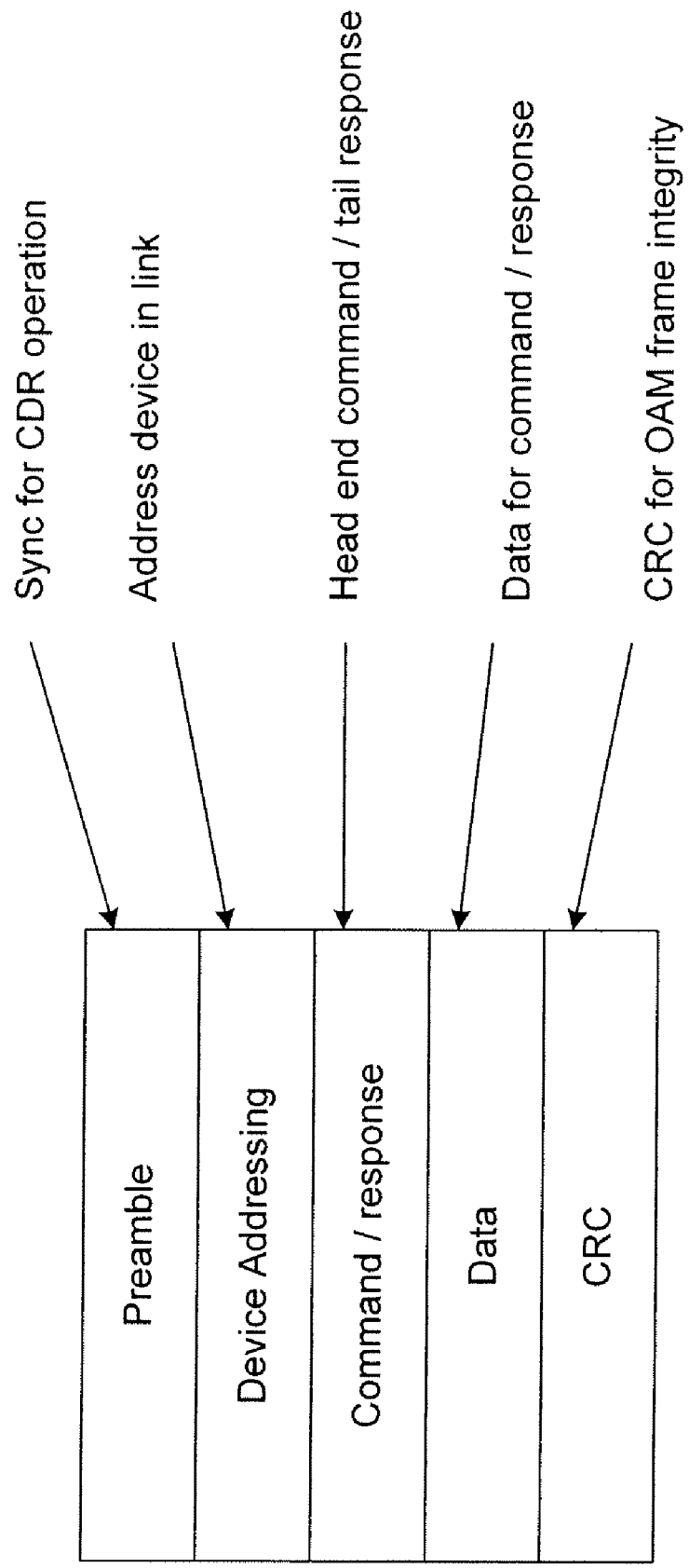
FIG. 9 is a diagram of a basic structure of an OAM frame in accordance with one embodiment of the invention.

An exemplary, basic OAM frame format is depicted in FIG. 9. The preamble byte uses the inverted pattern (1's complement) of the preamble seen in data frames (FIG. 2) so that the OAM frame can easily be differentiated in networks that do not support SOF (Start Of Frame) delimiters. The preamble has an alternating zero/one pattern used to establish clock recovery and indicate the start of the OAM frame.

Following the preamble, there is a frame payload that includes fields for the addresses of the ports involved with the OAM frame, a command or response, data, and a cyclical redundancy check (CRC) field for checking the integrity of the OAM frame. The CRC field reflects a calculation according to a well known algorithm that includes all data symbols of the OAM frame, excluding the preamble (and the block check if present, see below). OAM frames with erroneous CRC are discarded.

Figure 9A:
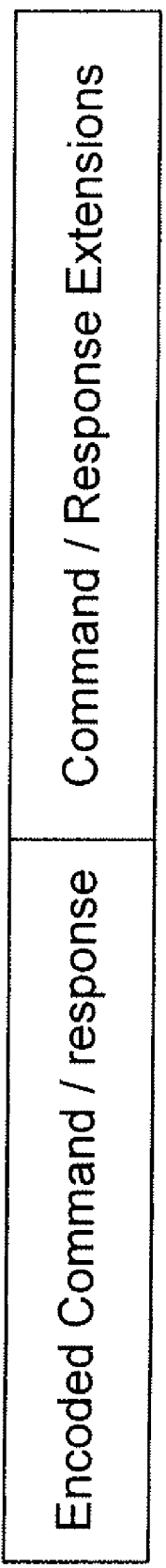
FIG. 9A is a diagram of a command/response field of the OAM frame of FIG. 9.

Referring to FIG. 9A, the command/response field of the OAM frame of FIG. 9 may include a first portion that contains an encoded command/response, and a second portion that includes command/response extensions. The extensions may be individual bits or encoded groups of bits for mutually exclusive transactions. The extensions may fine tune a generic command/response for a particular box, or may allow the use of a single command/response OAM frame to be used in place of multiple OAM frames, among other possibilities.

The OAM frame length may be 16 bytes of data or less, not including the preamble byte. A short OAM frame length ensures that the OAM protocol will have minimal effect on bandwidth. Idles may be inserted as needed to maintain the interframe gap.

The OAM protocol may operate in a plurality of modes or states, and each state may utilize a different format of an OAM frame. In the discussion below, we will describe a mode that has three states, which are called the Discovery, Initialization, or Operational states herein. Each such state has a different OAM frame format. At this juncture, we can usefully discuss the common fields of the OAM frames of these three states, while leaving a discussion of their unique fields until later when the Discovery, Initialization, and Operational states are discussed.

Figure 10:
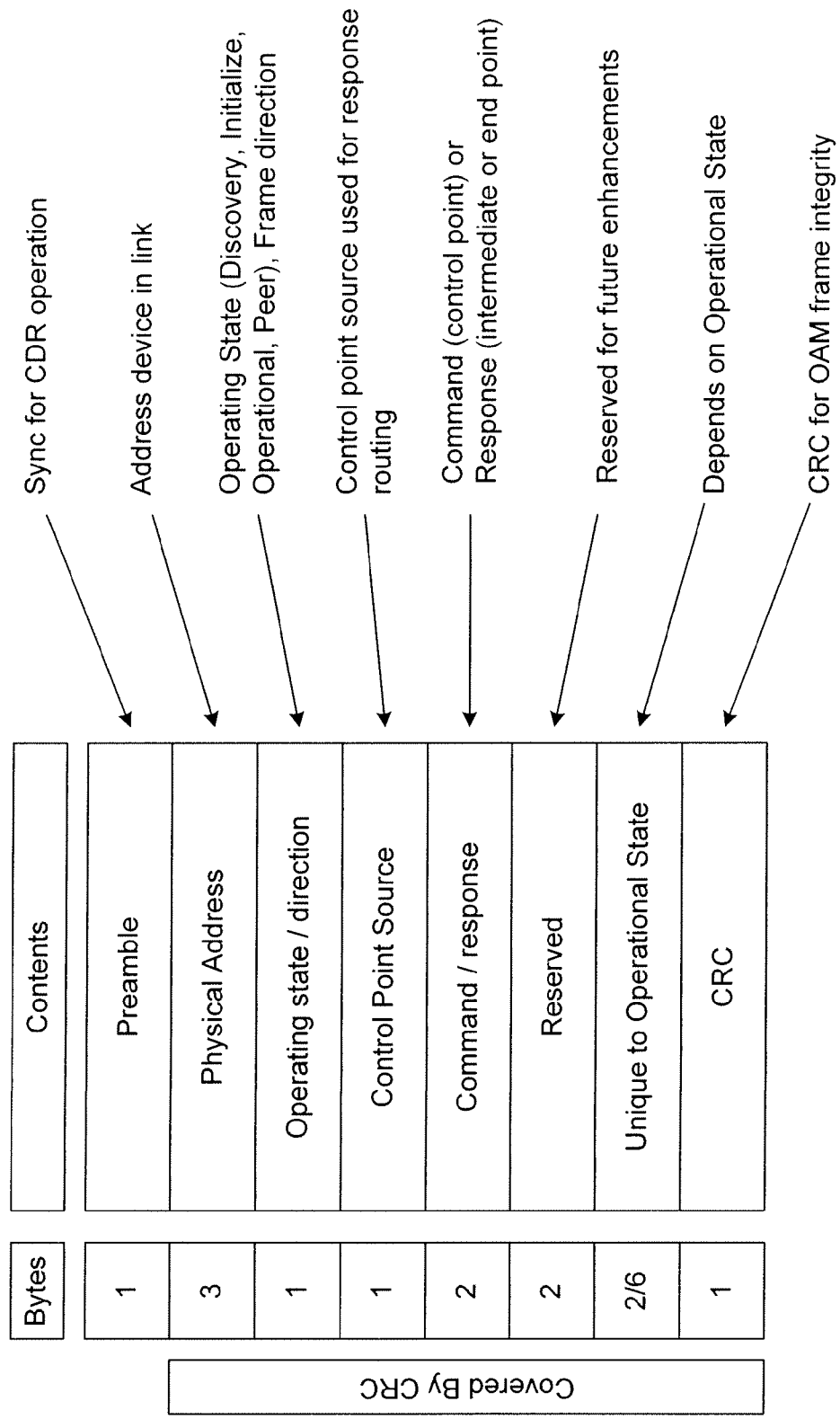
FIG. 10 is a diagram showing a more detailed structure of an exemplary OAM frame in accordance with one embodiment of the invention.

The common fields of the Discovery, Initialization, and Operational state OAM frames, in accordance with one embodiment of the invention, are shown in FIG. 10. Each OAM frame starts with a preamble byte, followed by a physical address field up to 24 bits long, thereby allowing for 16M addresses. The physical address is the address of a particular port of the box, e.g., an intermediate point or end point, that is in communication with the control point. The next field contains the operational state of this OAM frame (e.g., Discovery, Initialize, or Operation) or simply the frame type. Also included in the same byte as the operational state is a direction bit that indicates which way this frame is travelling: either in the direction of the control point or away from it. The next field is the control point ID. This can be up to 256 addresses and is used to tell the addressed unit where to send the response. In some networks, there may be multiple control points for redundancy purposes, and this field may be used to identify the appropriate control point to send a response OAM frame. The next field is the command/response field. This field is 16 bits long, and includes either a command or a response. The 16 bits break down into at least a command code and command extensions, or a response code and response extension. The commands and responses are preselected arrangements of bits that are known to the control point and the other involved port, and possibly to intermediate boxes, to indicate a particular command or response. Next is a two byte field reserved for future enhancements. Next, is a field of 2 or 6 bytes, called the unique field, that is unique to the Discovery, Initialization, or Operational states, and will be discussed below. Following the unique fields, there is an eight bit CRC that checks the integrity of all OAM frame data bytes except the preamble.

The OAM frames of FIG. 10 are routed in the data network by use of the addressee port field or the control point address field, and the direction bit. Associations of physical port addresses and control point addresses are in a registered map for each physical output port. These registers can be established through various methods. For instance, a first method could be to observe traffic on the inbound port along with the direction bit and adding the physical port addresses and the control point address into the routing information, as is done in a learning bridge, which can learn addresses served by a particular port. Alternatively, these registers can be loaded from the control point during the Initialize state. To facilitate lookups, the addresses can be allocated hierarchically.

On a multiple port box, there may be a physical routing table associated with each outbound port. The table indicates to the particular port to capture and transmit particular OAM frames that match the physical port or control point address in conjunction with the direction bit.

As exemplified by FIG. 10, the OAM frame may have a larger field for the address of the port of the intermediate or end point than for the address of the control point. The addressing can be asymmetrical in this regard, since there are many more intermediate and end point ports than control points. Also, by having fixed field positions for the port address and the control point, the OAM system can construct a return OAM frame to the control point with minimal effort. Effort is minimal because the OAM system at the port does not have to change the order of port and control point address fields or their content, but merely has to flip the direction bit to show that the direction of the OAM frame is reversed. Accordingly, the transmitter 40 of the OAM system of the addressee port need only focus substantial effort on responding to the command and gathering the requested data to be sent with the return OAM frame.

As mentioned above, an exemplary OAM protocol may have different modes of operation. A first mode is used in a data network that has one or more control points and end points, and possibly intermediate points between them. A second mode is simply a peer-based operation where there is no controlling entity and the OAM frames are only sent between peers. The peer to peer mode may be used, for instance, to monitor link integrity between the two peers for reporting to higher layers.

Figure 7:
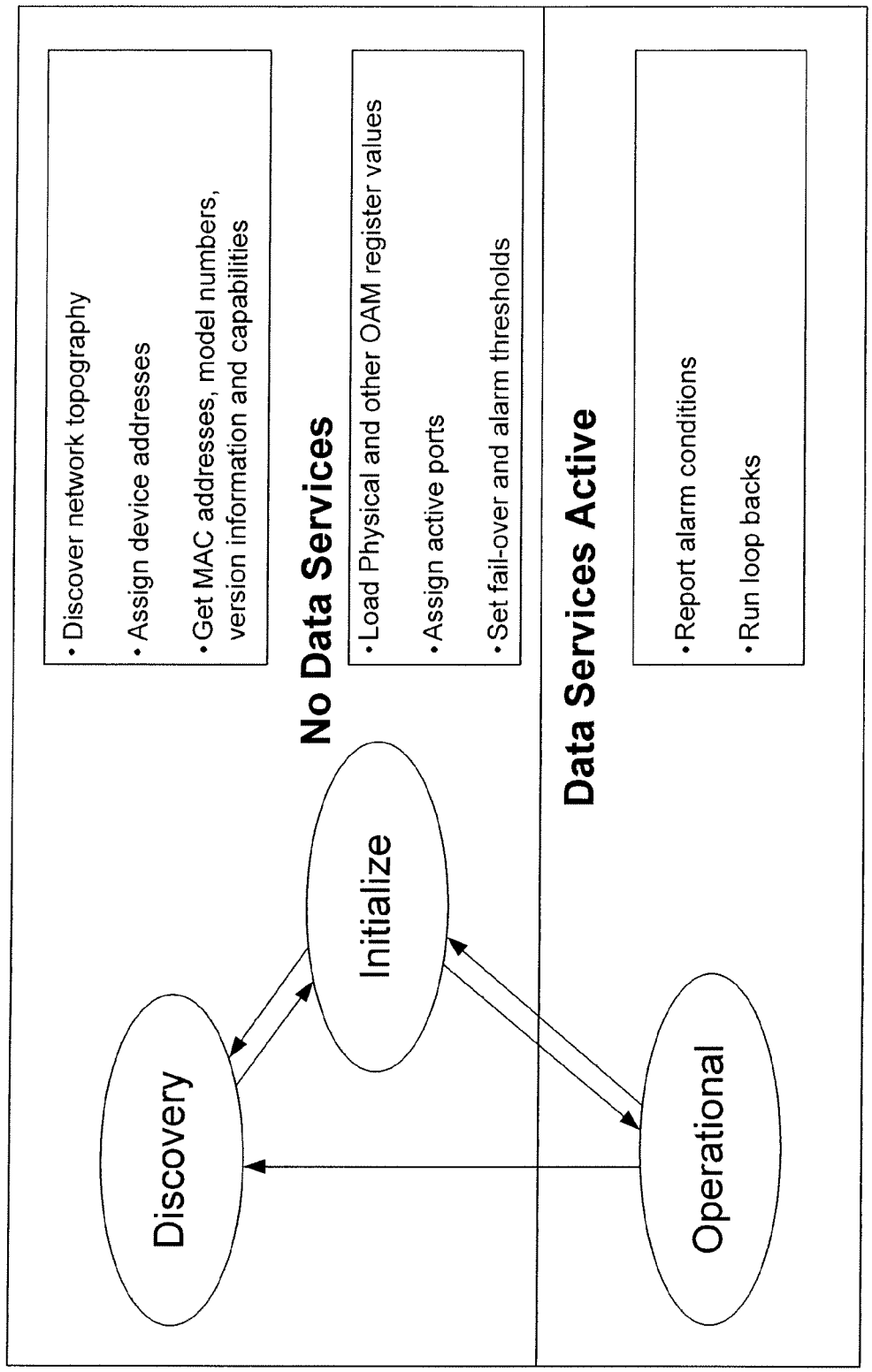
FIG. 7 is a state diagram showing three states of an exemplary OAM protocol mode.

The first mode of operation mentioned above may use distinct states, depending on the status of the communication. FIG. 7 depicts an exemplary mode of an OAM protocol that uses three distinct states to, for example, assign addresses, initialize network nodes, and monitor active and inactive links. These three states are called the Discovery, Initialize, and Operational states in our discussion. OAM frames are sent in each of the three states between the ports of control point(s), intermediate point(s), and end point(s) of the data network. Data services are only active in the Operational state.

During the Discovery state, the control point uses OAM frames to assign physical addresses to all of the ports of all of the intermediate and end points of the physical transmission link of the data network, or subportion thereof, that is controlled by the control point. Also during this state, the control point requests, and the respective ports at the intermediate and end points report, information concerning selected parameters associated with the particular port or box. This could include, for instance, the MAC address that the port is associated with, and the box's model number, serial number, revision level, and port and box level capabilities, among other possibilities. Such capabilities might include an identification of registers (e.g., the MDIO and OAM registers) that may be programmed, ingress/egress port configurations, status of ports, outbound link types and protocols, link speeds that are supported, and type of box (e.g., control point, end point, or intermediate point). Through or with such information, the control point would learn how many ports the box has and possibly where the ports are directed. Also during the Discovery state, an OAM frame with a low level Ping command may be sent before address assignment in point to point networks.

The address assignment process may vary depending on the physical link between the control point and end point. In one embodiment, the address assignment process starts at the closest connection point on the primary egress port of the control point and proceeds through sequentially through all ports of all intermediate points to the ingress ports of the end point(s). The initial OAM frame sent from the control point to the initial port of the closest connection point box may contain a null in the addressee field of the OAM frame, since the closest point may initially be unknown to the control point. The initial ingress port on the closest connection point will be assigned an address carried in the data field of the OAM frame, and will respond with information via an OAM frame that begins a process through which the entire topology of the network can be discovered and addressed. After an initial port is addressed, it acts as a go between for the control point in the addressing of other ports. Address assignment takes place on any secondary egress ports of the control point after all of the intermediate and end points have been assigned on the primary egress port.

Each port of each intermediate and end point boxes respectively return the address assigned to it to the control point in an OAM frame that also includes any parameters requested by the control point. Typically, a plurality of OAM frames will be sent from the remote point because the requested information will be more than what can be communicated in a single OAM frame. The control point may send a confirm OAM frame back to the responding port to acknowledge the response and that the address has been assigned correctly. Typically, a confirm OAM frame is used for shared networks (e.g., half-duplex or point to multipoint), but may be used as a sanity check for full duplex links.

If the control point learns through the received OAM frames that the responding box is an intermediate point, the address assignment operation continues in a manner appropriate to the physical facts discovered by the control point from the return OAM frames. The knowledge of whether a box is a control point, intermediate point, or end point is determined by states preconfigured in that particular box, and will be communicated back to the control point. If the assigning process terminates on another control point, the addressing stops down that path. The Discovery state operation is complete when a physical address is assigned to each and every port of each and every intermediate point and end point of the data network, and the control point has received back from the ports of the intermediate and end points the information requested by the OAM frames sent by the control point. Accordingly, the entire topology of the data network becomes known to the control point.

FIGS. 8A, 8B, 8C, and 8D show examples of Discovery state addressing processes. In FIG. 8A, a point-to-point link is shown between a port of a control point, e.g., service provider 20, which may be a central office of a telephone company, and a port of an end user, e.g., subscriber 22, over a fiber optic link 24. Connections 50, 52 between service provider 22 and an upstream system (e.g., the Internet or a MAN), and between subscriber 22 and a downstream system (e.g., a personal computer or a LAN), respectively, are shown opposite fiber optic link 24.

As an initial step, service provider 20 sends an OAM frame to subscriber 22 over fiber optic link 24. A direction bit of the OAM frame indicates that the OAM frame is being sent away from the control point. The OAM frame includes a command that assigns an address carried in the data field of the frame to a port of the box used by subscriber 22. The OAM frame may also request, for instance, in command extension fields, a MAC address, and a model number, version, and capability information (e.g., registers that can be programmed, or port status) concerning the box used by subscriber 22. In response, the receiving port in subscriber 22's box may send at least one, but typically more than one, OAM frames with a reversed direction bit back to service provider 20. The return OAM frames indicate the address assigned to the port, and also include the other requested information in a data field. Service provider 20 recognizes subscriber 22's box as an end point based on the information in the OAM frames received from subscriber 22.

FIG. 8B shows an address assignment process where, for instance, an intermediate device, such as a media converter 28, is disposed between a fiber optic link 24 (to which service provider 20 is coupled) and an electrical link 26 (to which subscriber 22 is coupled). Practitioners will appreciate that the types and numbers of intermediate devices will vary. For instance, a repeater may be present between service provider 20 and media converter 28.

As above for FIG. 8A, service provider 20 of FIG. 8B initially sends an OAM frame with an address assignment, and requests a MAC address, model number, version, and capabilities. As a second step, the receiving port of media converter 28 responds with a plurality of OAM frames having a flipped direction bit that contain its assigned address and that provide the requested information. Service provider 20 processes the information received, and based thereon recognizes that media converter 28 is not an end point. Once an address is assigned one of the ports to media converter 28, that port does not accept further address assignments. As a third step, after all of the ingress and egress ports of media converter 28 are addressed, service provider 20 sends out another OAM frame that passes through media converter 28 and is received by an ingress port of subscriber 22' box. The port (s) of subscriber 22's box respond to the control point with OAM frames including its assigned address and the requested information, as in FIG. 8A.

FIG. 8C reflects another exemplary addressing process. In this instance, there are two fiber optic links 24 between ports 1, 2 of service provider 20 and subscriber 22. Accordingly, service provider 20 sends out a first OAM frame assigning a port address and requesting a MAC address, model, version, and capabilities. Each port of subscriber 22 responds with OAM frames including its assigned address, as well as the other requested information. Typically, service provider 20 will recognize, based on the received OAM frames, that subscriber 22's box has a plurality of ports. Accordingly, service provider 22 sends out further Discovery state OAM frames, one for each port.

FIG. 8D shows a process for address assignment for shared networks. Service provider 20 sends out OAM frames assigning an address to each port of each box and requesting the port's MAC address, box model number, version, and port and box capabilities. The ports of subscriber 22's box responds with OAM frames that include its assigned address and the other requested information. In this example, there is a delayed response by the ports to avoid media contention. If a response is received by the service provider 20 and is correct (good CRC), then a confirming OAM frame is sent by service provider 20 to that particular subscriber 22. If a response is not received, the service provider 20 resends the OAM frame after a time interval. Once a particular port of subscriber 22 has an assigned address, then the particular port does not accept further address assignments. Parameters requested in shared access networks are retrieved in a similar manner as in non-shared access networks.

Figure 11:
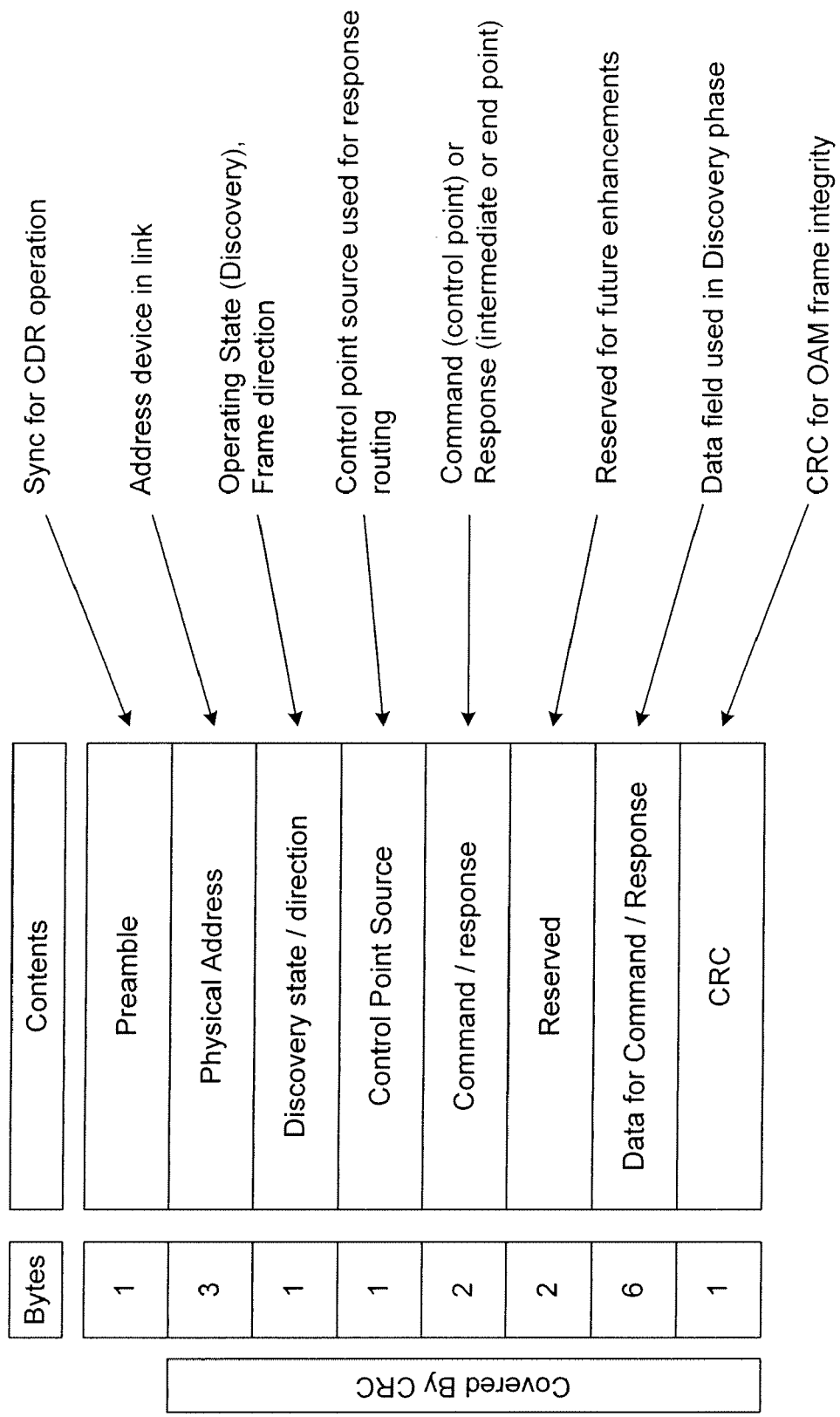
FIG. 11 is a diagram of an exemplary structure of an OAM frames for a Discovery state of the OAM protocol mode of FIG. 7.

As mentioned, there are unique fields for each of the three OAM frame types of this example. For the Discovery state, an exemplary OAM frame format is shown in FIG. 11. In this OAM frame, there is simply a 48 bit data field. This is meant to convey MAC addresses, model numbers, software revisions, and other capabilities back to the control point, and also to convey addresses to unassigned ports.

The commands and responses, including extension, to be communicated by the OAM frames are preselected arrangements of bits known to the control point, the responding port, and perhaps to any intermediate ports. The commands and responses, as well as the other information communicated in the OAM frames, may be stored in a memory or hard wired into an integrated circuit.

The command set for Discovery state may include, among other possibilities, Ping, Assign address, Assign bulk addresses, Assign address with delayed response, and Confirm Assignment. The command extensions for the Discovery state may include Get MAC address, Get Model Number, Get Version Number, Get Capabilities, and Get Extended Capabilities. The Responses used during the Discovery state may include, among other possibilities, Ping Response, Return MAC address, Return Model number, Return Version number, Return Capabilities, and Return Extended Capabilities. Note that the control point can send a single OAM frame that assigns the address, and requests multiple informational responses from the intermediate or end point.

In one embodiment, the OAM protocol includes a process for bulk address assignment, wherein a box (typically an intermediate point) in the network may have addresses assigned to each of a plurality of ports of the box using a single OAM frame sent from a control point. While the same result could be achieved by the control point sending an OAM frame to each port of the particular box, a bulk assignment process can be more efficient.

In one embodiment of a bulk assignment process, the control point sends an OAM frame to a box having a plurality of ports. The OAM frame includes a base physical address in the data field and a command that assigns the base physical address to the initial port that receives the OAM frame. The initial port of the box receives the OAM frame, and sends at least one, but typically a plurality of OAM frames back to the control point with the assigned address and other requested information. However, the OAM frame received by the initial port from the control point also instructs, typically through a command extension, the initial port to increment the address in the data field of the OAM frame and pass the incremented OAM frame to the next port of the box. Accordingly, the process repeats at each port of the box. After all ports have a different, sequential assigned address, the OAM frame is passed back to the initial port, where it terminates, since the initial port already has an assigned address. The control port, having received response OAM frames from each port of the box, can then proceed to the next box, if any, or if done, terminate the Discovery state and move to the Initialize state, as discussed below.

Returning to FIG. 7, once physical layer addresses are established for each box on the physical transmission link, the first mode of operation mentioned above moves into a second state, which is called the Initialize state. In the Initialize state, remote physical registers and parameters are written and read by the control point through Initialize state OAM frames. The registers may be located at, for instance, ports of subscriber 22 of FIGS. 8A–8D or at intermediate points such as media converter 28. The control point typically will learn whether registers in the port of interest can be programmed during the Discovery state, when capabilities information is sent by the port to the control point.

Figure 12:
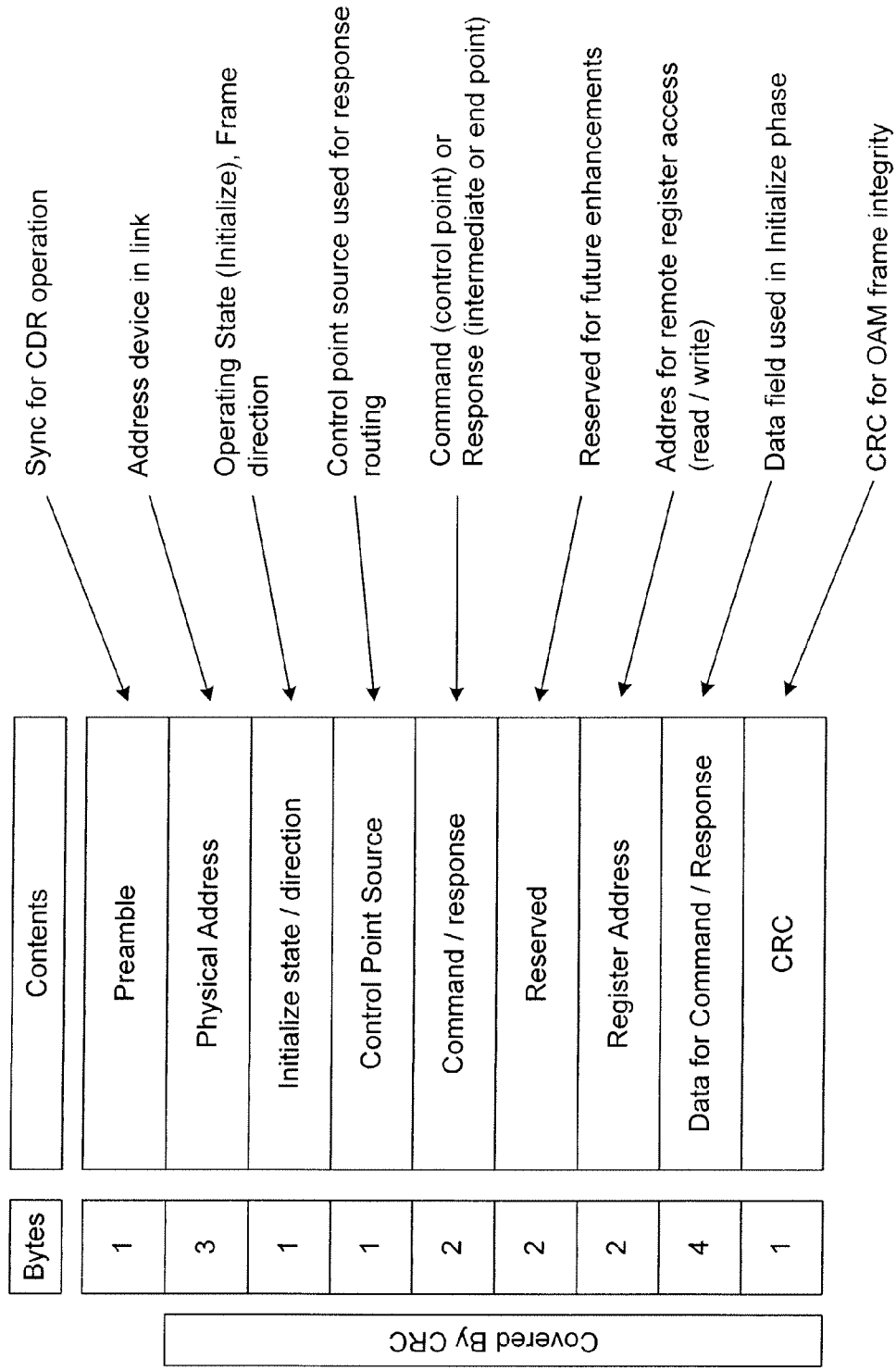
FIG. 12 is a diagram of an exemplary structure for an OAM frame for an Initialize state of the OAM protocol mode of FIG. 7.

An exemplary OAM frame for the Initialize state is shown in FIG. 12. The unique part of this frame is split into a 16 bit address field identifying the address of the register to be read or written, and a 32 bit data field containing data to be written if the command is a write register command. Since the registers may be of varying size, e.g., 16 bits or 32 bits, provision is made for reading and writing different size registers. The control point can select, based, for instance, on information received from the intermediate or end point box during the Discovery state, and using a command with a specified command extension, whether 16 bits or 32 bits of data is to be read from or written to the register Through commands and command extensions, the following operations may be available during the Initialize state: Ping, Set Semaphore, Release Semaphore, Start Data Service, Write Register, Read Register, Read Register Before Write, Read Register After Write, Select Register Set, Select MDIO register set, Select OAM register set, Select 16 or 32 bit operation, and Loopback, among other possibilities. The responses from the intermediate or end points may include Ping Response, Operational Status, Read Register Value Before write, and Read Register Value After Write, among other possibilities. The response extensions may be MDIO or OAM register indicator, and 16 or 32 bit indicator, among other possibilities.

In one embodiment, in an atomic operation during the Initialize state, the control point can send out a single OAM frame that, through commands and command extensions, can instruct a port at a receiving intermediate or end point box to read a register before a write to the register, to write a specified value to the register, and to read the register after the write. In such a case, the receiving port would transmit back to the control point, for instance, a first OAM frame with the register contents before the write, which may be used later by the control point to recover the prior state of the register, and with a second OAM frame with the register contents after the write, confirming the operation.

The Initialize phase can program remote Level 1 (PHY) registers, such as the MDIO registers or OAM registers. The OAM frame contains all of the information needed to address, read and/or write the registers. Registers associated with Layer 2 and above (see FIG. 1) are not accessible by the OAM protocol, as these registers are handled by the Simple Network Management Protocol.

MDIO registers are partially defined by the IEEE standards and partially defined by the vendor of the particular device. During the Discovery phase, the control point provider learns the model number and version of the intermediate and end point boxes in the link, and can program physical registers in the various ports thereof using the received information and, possibly, a related data base stored at the control point.

For OAM registers, there are special routing registers that define how OAM frames that pass through the box are routed on the outbound side. This is a static configuration that is fixed until the network is reconfigured.

Figure 12A:
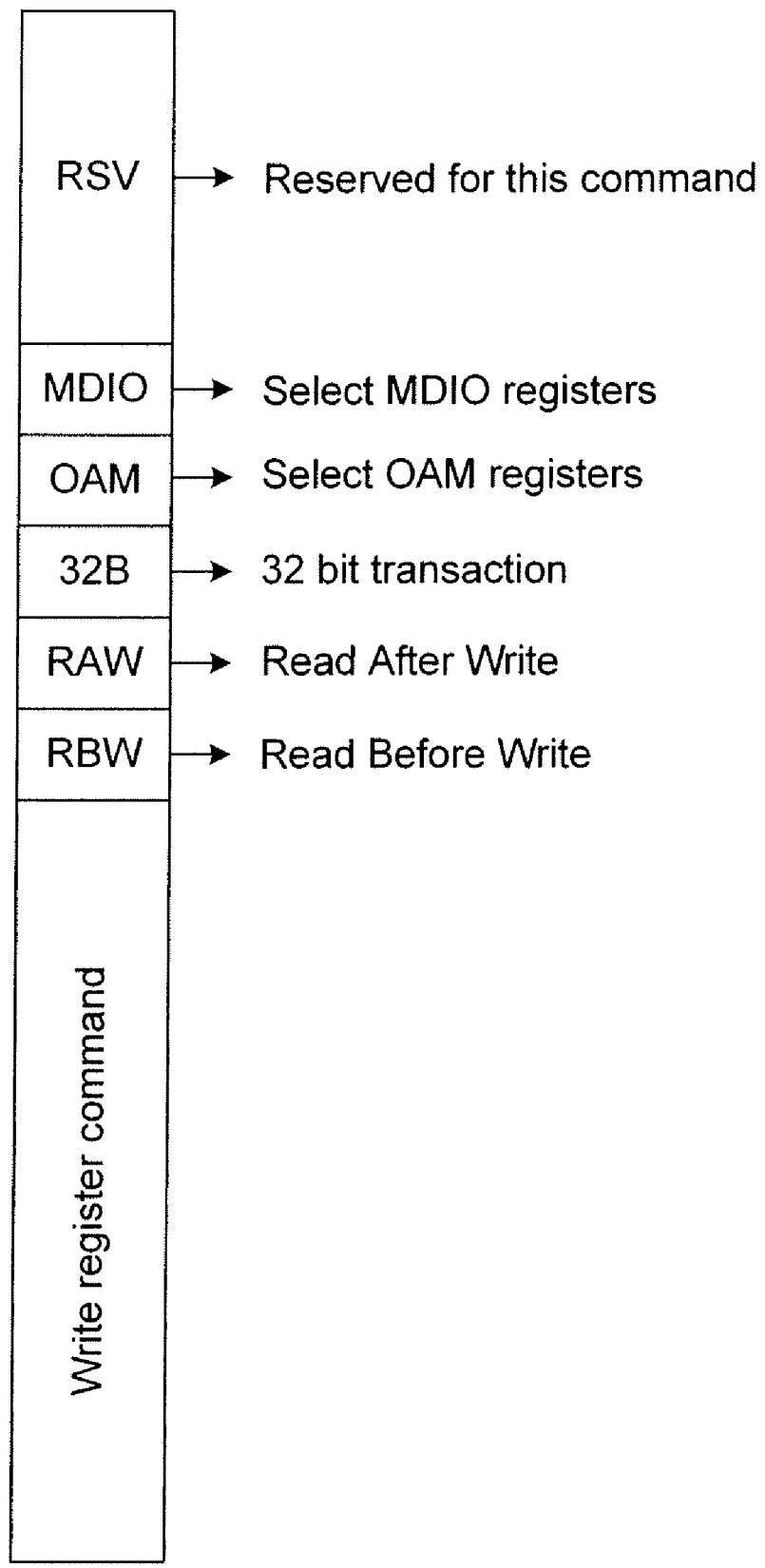
FIG. 12A is a diagram of a command field of the OAM frame of FIG. 12.

FIG. 12A shows an example of a command field for an OAM frame sent by a control point to a port of an intermediate or end point during the Initialize state. In this case, the command field is apportioned so that a first portion of the command field includes a write register command, and a second portion of the command field includes bits for command extensions. The command extension bits in this case are for Read Before Write (RBW), Read After Write (RAW), 32 bit transaction (32B), Select OAM Registers (OAM), and Select MDIO registers (MDIO). Further bits in the field can be reserved for future capabilities. One such capability might be for programming additional PHY layer registers besides OAM and MDIO registers as such registers are defined, e.g., by the IEEE.

Where registers of particular ports of an intermediate or end point box can be programmed remotely, e.g., by a control point using CAN frames, as discussed above, or locally, e.g., by a microprocessor in the box or by user at the box (e.g., a service technician), a semaphore method may be used to arbitrate conflicts between the remote entity and the local entity concerning the programming of the registers. In one embodiment, setting and releasing the semaphore occurs from the control point and is a state maintained by the intermediate or end point. The semaphore may be implemented as a bit. For instance, if the control point seeks to program a register, then an OAM frame will be sent by the control point commanding that the semaphore be set, and that the register be written (and possibly read before and after the write) according to the data in the OAM frame. If the semaphore has not previously been released to a local user, then the semaphore will be set, and the OAM system at the particular port of the box will return one or more OAM frames to the control point indicating that the commanded operation was successful. With the semaphore now set, local access is blocked, and local access can only be gained through some communication, external or perhaps through a self-initiated OAM frame, from the local user to the control point. If the local agent is already controlling the register, then the control point would receive back an OAM frame indicating that the command could not be executed. Since there may be a plurality of registers that can be accessed remotely, a fact learned by the control point in the Discovery state, a situation is possible where the control point may access some of the registers, and may not access others. This requires, of course, multiple semaphores, one for each bank of registers. Again, return OAM frames would inform the control point of which of the registers were accessible. A timer may operate while a local user is controlling the registers, so that after some period of time or inactivity control of the registers will be returned to the control point.

After the Initialize phase of FIG. 7 is complete, a third state of the first operational mode is entered, called the Operational state herein. During the Operational state, data communications commence between the control point and the end point(s) of the data network (e.g., service provider 20 and subscriber 22 of FIGS. 8A–8D) through the physical transmission link and any intermediate points. During the transmission of the data frames, the control point periodically sends out an OAM frame in the stream of data frames. The cadence of the OAM frames is a variable that may be selected by the control point independently of the frequency of the data frames. As mentioned, the OAM frame may be addressed to any port of any of the boxes in the physical transmission link, e.g., to an intermediate point or an end point. Intermediate ports other than the addressee port may determine that the OAM frame is for a port of an accessible downstream box, and relay the OAM frame to the addressee port. The OAM frame may command, for instance, that the addressee port return a status report for its box or port. The OAM frames are processed by the addressee port through, for instance, an internal OAM system (hardware and/or software) as shown in FIGS. 6, 6A. The addressee port then returns one or more OAM frames to the control point in accordance with the command(s) of the received OAM frame, as required by the OAM protocol. Since the OAM frames exist only at the physical layer, and are not received by or processed by higher layers in the protocol stack, the transmission link between each pair of egress and ingress ports can be monitored, and the status of any box may be learned, with only minimal bandwidth impact, since the cadence can be selected and the OAM frames are short.

Inactive physical transmission links that do not have data frames passing on them at a given time, such as a redundant link between, for example, the control point and an intermediate or end point, or a redundant control point and an intermediate or end point, nonetheless may have OAM frames passing on them to operate, administer, and maintain the link in accordance with the OAM protocol. Accordingly, the control point(s) will know the status of inactive physical transmission links should it be necessary to activate the inactive link.

Figure 13:
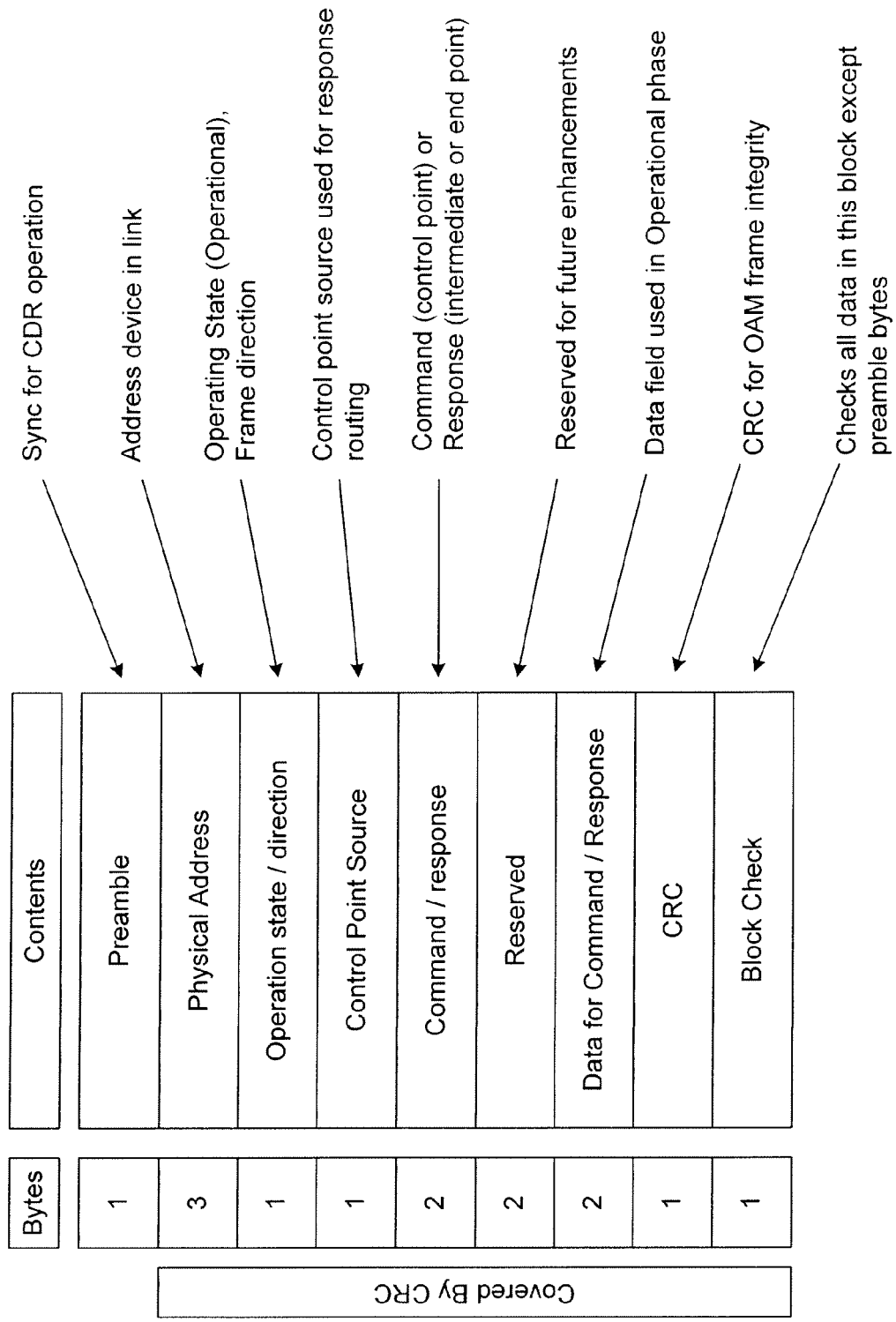
FIG. 13 is a diagram of an exemplary structure of an OAM frame for an Operational state of the OAM protocol mode of FIG. 7.

An exemplary Operational state OAM frame is shown in FIG. 13. It has a single 16 bit data field in the unique area. This is meant to contain indicators mainly from intermediate and end points that contain alarm states or other operating status information. In addition, there is an extra block check field after the CRC that may be used to monitor the integrity of the physical transmission link. This capability is discussed below.

The command set for the Operational state may include, Ping, Set Loopback, Clear Loopback, Request Status, and Stop Data Service, among other possibilities. The response set for the Operational state may include, among other possibilities, Ping Response, Return Operational Status, and Alarm condition. Command or response extensions may be defined, so that the command/response field of the OAM frame of FIG. 13 is apportioned into a command/response portion and a command/response extension portion.

As mentioned, the Operational state OAM frames may be used to solicit and report status and alarm conditions at intermediate or end point boxes along any of the physical transmission links of the data network (e.g., at media converter 28 of FIG. 8B or at subscriber 22 of FIGS. 8A–8D). The status and alarm conditions will obviously vary with the type of device. Alarm conditions may include imminent power failure, low battery power, service door ajar, fan failure, high temperature, adjacent port failure, and the like. The OAM frames can uniquely identify both the status/alarm and the location thereof to the control point through the specific addresses previously assigned to the ports of the responding box. The OAM system of the control point would include the capability to decode the OAM frame received from the transmitting box to identify the status or alarm condition, and act on it (e.g., by reporting the alarm condition to higher levels or switching to a redundant transmission link). Typically, the status or alarm condition could be transmitted back to the control point by the affected box in a single OAM frame.

FIG. 13A shows an example of a response field for an OAM frame sent by a port of an intermediate or end point to a control point during the Operational state. In this case, the response field is apportioned so that a first portion of the field includes an encoded response, and a second portion includes various extensions, which here are labeled as Overlays (OL) 1–3 and Auxiliary status (AUX) 1 and 2. The extensions may be individual bits or encoded groups of bits. A third portion of the response field is reserved for future capabilities. The overlay extensions could be used to provide information particular (e.g. vendor, or model, or version specific) to the responding box that clarifies or adds to a standard alarm/status response used generically by multiple boxes of the network. The auxiliary status also could be particular to the responding box, but might reflect alarms or status that are unique to the particular box. (The control point had previously been apprised of the availability of such overlay and auxiliary status capabilities during the Discovery state, when information concerning the responding box was received by the control point). For instance, all boxes might have the capability of reporting a fan failure alarm, but a particular box might also have an overlay allowing the box to report whether the fan is partially operating or has completely failed. In addition, the box may have an auxiliary status report capability to report a temperature inside the box, which would be useful in the context of a fan failure.

Figure 13B:
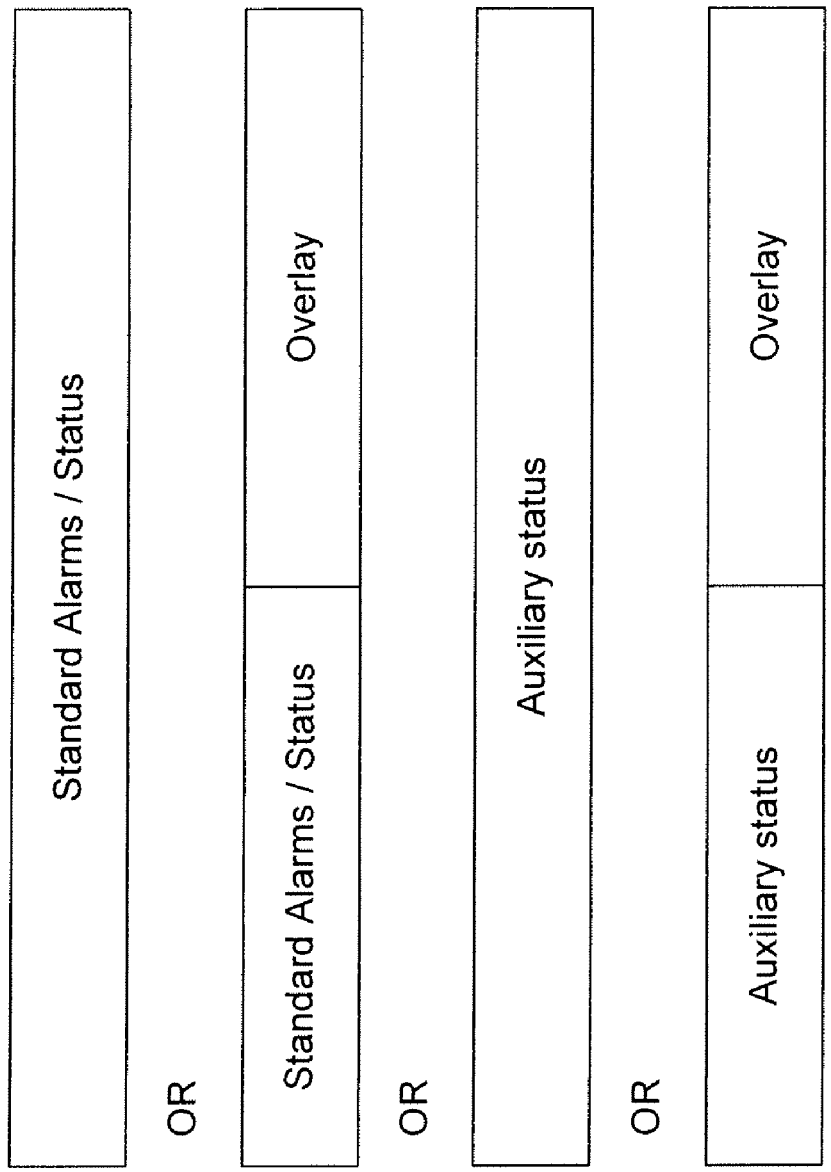
FIG. 13B is a diagram of a data field of the OAM frame of FIG. 13.

FIG. 13B shows some exemplary information that an intermediate or end point box could send to a control point in the data field of an OAM frame in response to an Operational state OAM frame with a status request command. Four possible data fields are shown, with the particular data fields to be sent to the control point either being specified by the control point or determined by the responding box depending on its internal programming. Such internal programming may allow the responding box to select which status/alarm information is most important to be sent to the control point on any given situation and in what order, so that the most important status/alarm information is sent first and the least important is sent later or not sent. For instance, a port of the responding box could send an OAM frame back to the control point that includes a response field (FIG. 13A) and any one of the data fields of FIG. 13B. The data may be a standard status/alarm response, or a standard status/alarm response and an overlay response, or an auxiliary status response, or an auxiliary status response and an overlay response, or some other combination. Higher priority information could be sent in the upper bits of the data field, and lower priority information could be sent in the lower bits. Multiple responses also could be sent including all of the status/alarm information of FIG. 13B.

As mentioned above, the Operational state OAM frame (FIG. 13) may include a block check field appended to the OAM frame after CRC field that can be used to as part of a method that monitors the integrity of any of the physical transmission links of the data network, since each ingress and egress port in the network has an OAM system and OAM address. Exemplary methods of monitoring the physical transmission link integrity are shown in FIGS. 14A and 14B.

Figure 14A:
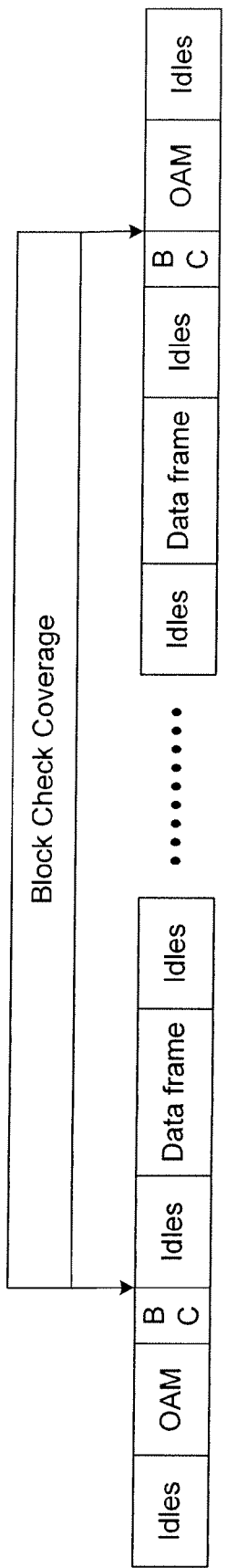
FIGS. 14A and 14B are diagrams showing a method of checking the integrity of a physical transmission link using a block check field of the OAM frame of FIG. 13.
Figure 14B:
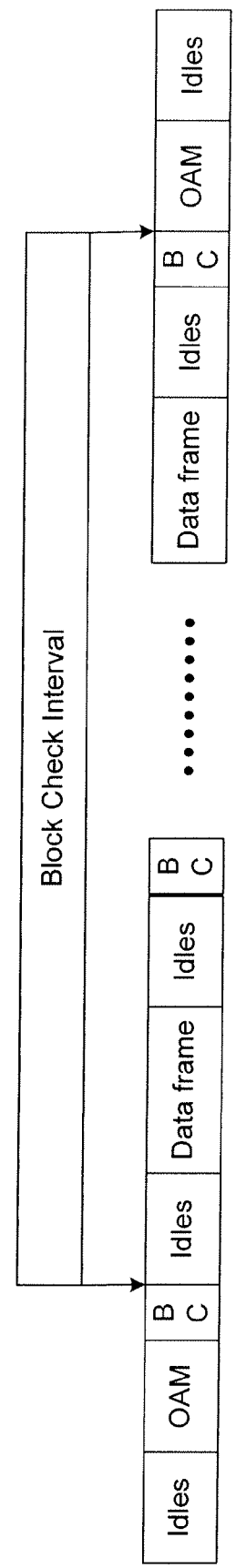

Referring to FIGS. 13 and 14A, the block check field of the OAM frame includes a value calculated using an algorithm, such as the CRC or BIP method. The block check calculation is generated on the transmission side of the link and is checked on the receive side of the link. The block check calculation is made in the OAM system (FIG. 6, 6A) of the egress port using all of the data symbols (non-control), excluding preambles of the data frames and the second OAM frame, transmitted between the block check fields of the two successive OAM frames. The block check value is then appended to the second OAM frame. In the context of an HDLC framing system, the flags, being data symbols, could be included in the block check calculation. A transmit block check function 45, which may be implemented in an integrated circuit chip, for performing the block check calculation, is coupled in a loop to OAM mux 42 of the OAM system of FIGS. 6 and 6A.

On the receive side of the transmission, receipt of the initial OAM frame by the ingress port starts the reverse process, wherein the data symbols of the incoming data stream between the block check fields of the two successive OAM frames are sent through the algorithm, and a block check value is obtained. The block check value calculated on the receive side of the transmission is then compared to the block check value generated on the transmission side, which was appended to the second OAM frame. If the block check value calculated by the OAM system of receiving port matches that of the received second OAM frame, then the integrity of the physical transmission link is verified. If, however, there is a difference between the block check value calculated by the receiving box and that of the received second OAM frame, then a transmission link error occurred. In FIGS. 6, 6A, a receive block check 46, which also may be implemented in an integrated circuit, perform the receive side block check calculation. The receive block check 46 is coupled between the incoming receive side PCS sublayer and OAM transmitter 40, which would report a detected line integrity error condition via an OAM frame to the control point.

Preliminary to the method of FIG. 14A, during for instance the Initialization state, a link integrity error counter 47 (FIGS. 6, 6A) is set in a register at each port in the various control point, intermediate point, and/or end point boxes of the network that receive OAM and data frames. A variety of other registers values could be set in other error registers (not shown) to trigger warnings to the control point at lower error thresholds. An interval over which the errors are to be counted, as shown in FIG. 14B, also is programmed into a register of the port. As the OAM frames are received, the block check value is calculated, and if an error is detected, the error counter is incremented. This occurs continuously over the interval. An OAM system of a port of intermediate or end point box can be internally programmed, either through hardware or software, to take particular actions if an error threshold set during the Initialization state is exceeded over a particular interval. Such actions may include sending an OAM frame through OAM transmitter 40 reporting an alarm indication to the control point, or reporting a threshold value to the end point. The port's error counter 47 resets at the interval boundary. Thus, errors in a physical transmission link can be detected in real time, and the control point can be apprised, through OAM frames returned to the control point, of a line integrity alarm condition or the achievement of an error threshold.

An aspect of the block checking methods described herein is that the frequency of the OAM frames sent by the control point, the block check interval, and the error threshold are all independent parameters. Accordingly, one could program different block check intervals and error thresholds at intermediate points verses end points depending, for instance, on the type of physical transmission media or an agreement concerning link integrity between a service provider and an end user. Thus, a service provider could, with the information on line integrity and box status provided through the OAM protocol, make transmission link changes in real time to comply with such agreements. In other words, the service provider can identify and locate physical faults in the data network, and effect fixes.

In the Operational phase, Ping and Loopback commands are available line diagnostics. In one embodiment of a loop back operation, a control point would command a port of a box, via an OAM frame, to loop back a series of test data frames. However, the incoming stream of data to the port would include both the test data frames and OAM frames. The OAM frames would be separated from the test data frames and processed at the port (e.g., in the OAM system of FIG. 6) while the data frames are looped back to the control point.

The OAM systems at the ports of the intermediate and end points can be programmed to use an internal clock to time an interval between OAM frames. If periodic OAM frames are not received from the control point, as would occur if a transmission link were severed, then the OAM system of the port can be programmed to send out a unique OAM frame with an alarm. The unique feature could include a control point address that can be forwarded out of any outbound port of the box that has a path to any control point.

While much of the discussion herein focuses on embodiments of packet switched data networks, the invention is also applicable in other types of networks, such as telephony networks, that carry packet switched data.

This disclosure provides exemplary embodiments of the present invention. The scope of the present invention is not limited by these exemplary embodiments. Numerous variations, whether explicitly provided for by the specification or implied by the specification, may be implemented by one of skill in the art in view of this disclosure without departing from the present invention.

I claim:

1. A data communication method comprising:
   forming or receiving first and second data frames, the first and second data frames each having a preamble and a payload following the preamble, the preamble of the first data frame being an inverse of the preamble of the second data frame; and
   forwarding the first and second data frames to different protocol stack layer recipients based on the different preambles thereof.

2. The method of claim 1, wherein a sole recipient of any forwarded said first data frame is a physical layer of a protocol stack, any said second data frame being forwarded to a layer of the protocol stack higher than the physical layer.

3. The method of claim 1, wherein the different recipients are different layers of a protocol stack.

4. A data communication method comprising:
   receiving first and second data frames, the first and second data frames including a preamble and a payload following the preamble; and
   multiplexing the first and second data frames between a plurality of possible protocol services based on a contents of the different preambles thereof,
   wherein the preamble of the first data frame is an inverse of the preamble of the second data frame.

5. The method of claim 4, wherein a preamble having a first bit pattern causes the first data frame to be forwarded in the multiplexing step to a physical layer port, and a preamble having a second bit pattern causes the first data frame to be forwarded in the multiplexing step to a protocol layer higher than the physical layer.

6. A data communication method comprising:
   receiving first and second frames, each of the first and second frames including a preamble, the second frame including an initial portion serving as a start of frame delimiter;
   multiplexing the second frame between a plurality of possible protocol services based on a content of the initial portion,
   wherein the preamble of the first frame is an inverse of the preamble of the second frame.

* * * * *

UNITED STATES PATENT AND TRADEMARK OFFICE
CERTIFICATE OF CORRECTION

PATENT NO.        : 7,177,325 B2                                      Page 1 of 1
APPLICATION NO.   : 10/144569
DATED             : February 13, 2007
INVENTOR(S)       : George R. Claseman It is certified that error appears in the above-identified patent and that said Letters Patent is hereby corrected as shown below:

Title page, section (54), amend invention title to -- DATA COMMUNICATION METHOD USING INVERTED PREAMBLE --.

Column 8, line 32, replace "and" with -- an --.

Column 8, line 35, replace "74." with -- 70, an --.

Column 8, line 38, replace "of" with -- to --.

Column 8, line 52, replace "send" with -- sends --.

Column 8, line 55, replace "PRY" with -- PHY --.

Column 9, line 17, insert -- to -- before "pass".

Column 16, line 3, replace "CAN" with -- OAM --.

Column 20, Claim 4, line 41, delete "a".

Signed and Sealed this

Second Day of October, 2007

JON W. DUDAS
*Director of the United States Patent and Trademark Office*